(12) United States Patent
Fujiwara et al.

(10) Patent No.: US 7,198,565 B2
(45) Date of Patent: Apr. 3, 2007

(54) AUTOMATIC BONING SYSTEM OF UPPER HALF OF SLAUGHTERED EDIBLE FOWL

(75) Inventors: Yoshimitsu Fujiwara, Koto-ku (JP); Hiroyuki Hayakawa, deceased, late of Koto-ku (JP); by Katsuhiro Hayakawa, legal representative, Koto-ku (JP); Noriyuki Inoue, Koto-ku (JP); Kousuke Matsumoto, Koto-ku (JP)

(73) Assignee: Mayekawa Mfg. Co., Ltd. (JP)

( * ) Notice: Subject to any disclaimer, the term of this patent is extended or adjusted under 35 U.S.C. 154(b) by 0 days.

(21) Appl. No.: 11/497,228

(22) Filed: Aug. 1, 2006

(65) Prior Publication Data

US 2006/0270331 A1 Nov. 30, 2006

Related U.S. Application Data

(60) Division of application No. 11/150,826, filed on Jun. 10, 2005, now Pat. No. 7,104,879, which is a continuation-in-part of application No. PCT/JP03/09166, filed on Jul. 18, 2003, which is a continuation of application No. PCT/JP02/12960, filed on Dec. 11, 2002.

(51) Int. Cl.
*A22C 17/02* (2006.01)

(52) U.S. Cl. .................................. 452/154
(58) Field of Classification Search ........ 452/149–155, 452/163, 166–169
See application file for complete search history.

(56) References Cited

U.S. PATENT DOCUMENTS 3,750,231 A * 8/1973 Schreuder .................. 452/168

| | | | |
|---|---|---|---|
| 4,385,419 A | 5/1983 | Cantrell | |
| 4,709,448 A * | 12/1987 | McGuire et al. ............ | 452/167 |
| 4,935,990 A * | 6/1990 | Linnenbank ................ | 452/167 |
| 5,188,559 A * | 2/1993 | Hazenbroek ................ | 452/167 |
| 6,251,004 B1 | 6/2001 | Nemeth | |
| 6,558,243 B2 * | 5/2003 | Minemura et al. .......... | 452/149 |

FOREIGN PATENT DOCUMENTS

EP    0 813 814 A2    12/1997

(Continued)

OTHER PUBLICATIONS

Relevant portion of European Search Report of corresponding European Application EP 03 74 1489.

*Primary Examiner*—Thomas Price
(74) *Attorney, Agent, or Firm*—Rossi, Kimms & McDowell LLP

(57) ABSTRACT

An automatic boning system of the upper half of a slaughtered fowl is provided, in which the number of processing steps is decreased, integrated control using cams is adopted instead of individual control of prior art using hydraulic actuators, and an improvement in yield is achieved. The automatic boning system of the upper half of a slaughtered fowl comprises a main intermittently stepwise feeding section (11), a group of eight stations, and a cam mechanism (14). The main intermittently stepwise feeding section (11) comprises a rotary disk (12) which is rotated intermittently stepwise at an angle of 45° by means of a stepwise driving device (12a), and eight attachment cones 13 located on the peripheral part of the disk 12 at a spacing of angle of 45°.

3 Claims, 21 Drawing Sheets

FOREIGN PATENT DOCUMENTS

| | | |
|---|---|---|
| EP | 0 931 459 A1 | 7/1999 |
| EP | 1 169 921 A1 | 1/2002 |
| JP | 6-284854 A | 10/1994 |
| JP | 7-39296 A | 2/1995 |
| JP | 9-103231 A1 | 4/1997 |
| JP | 10-66504 A | 3/1998 |
| JP | 11-266780 A | 10/1999 |
| JP | 2001-211818 A | 8/2001 |
| JP | 2002-238444 A | 8/2002 |

* cited by examiner

Pre-processing (Skin scraping step)

Fig. 7
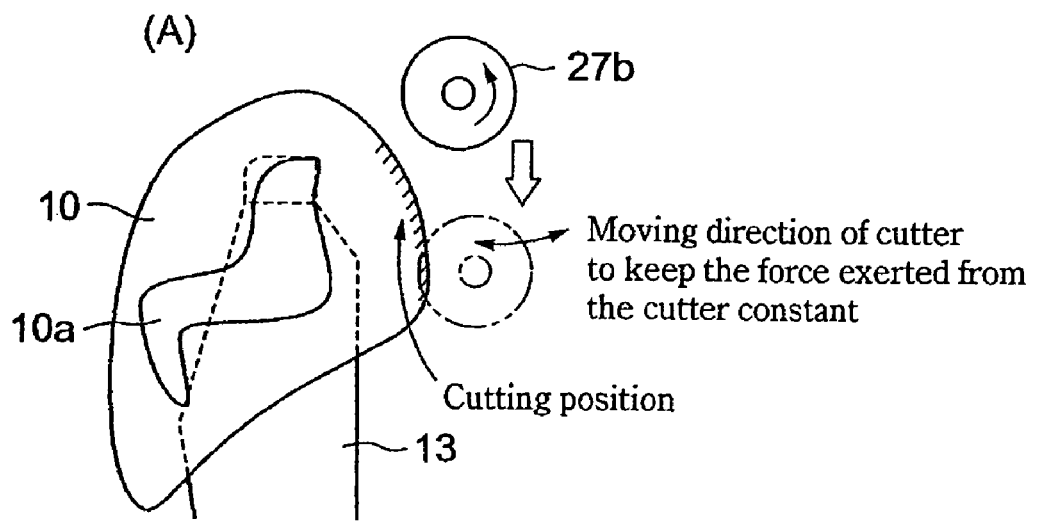
(A)
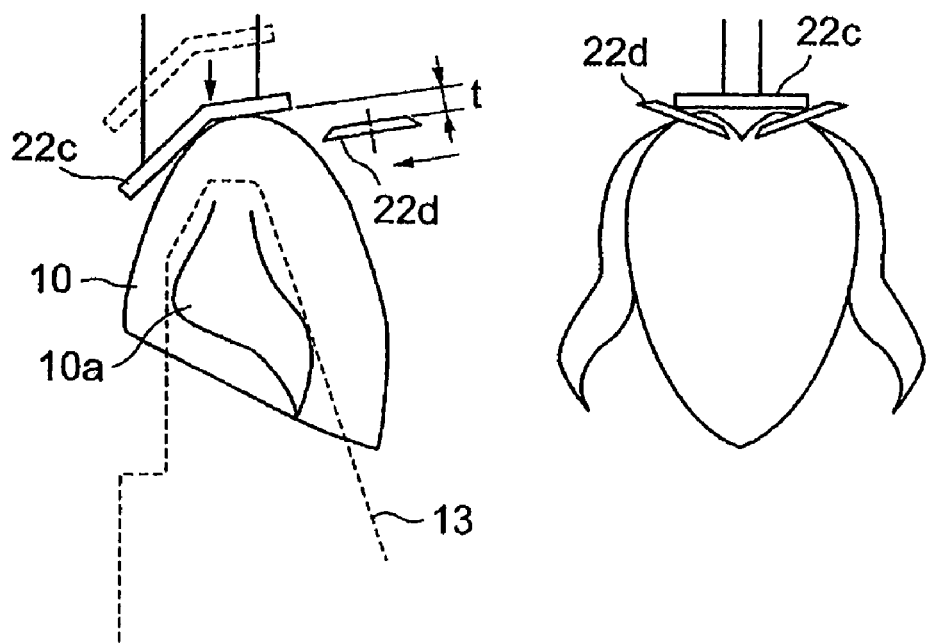
(B)

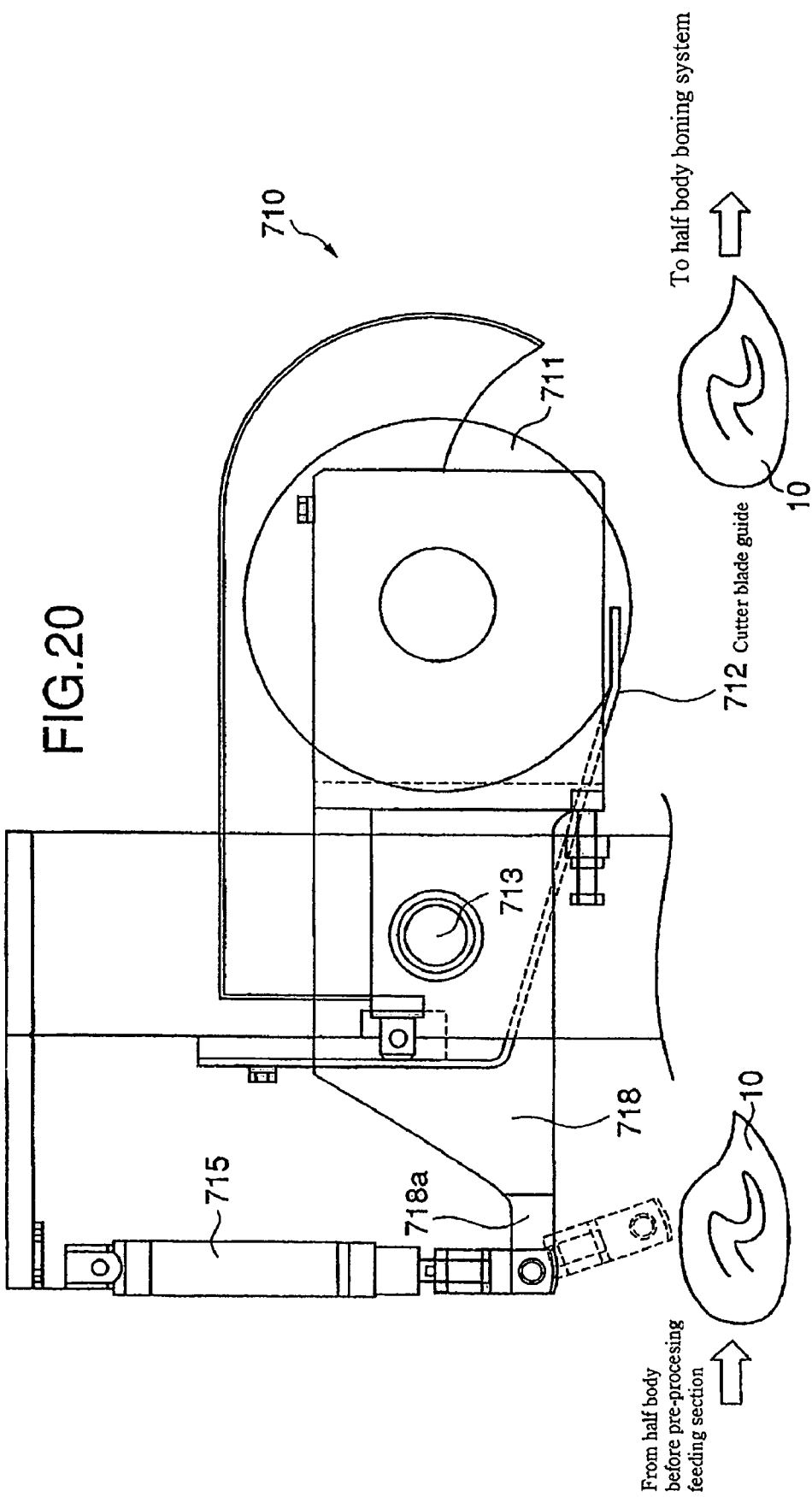

Fig. 22
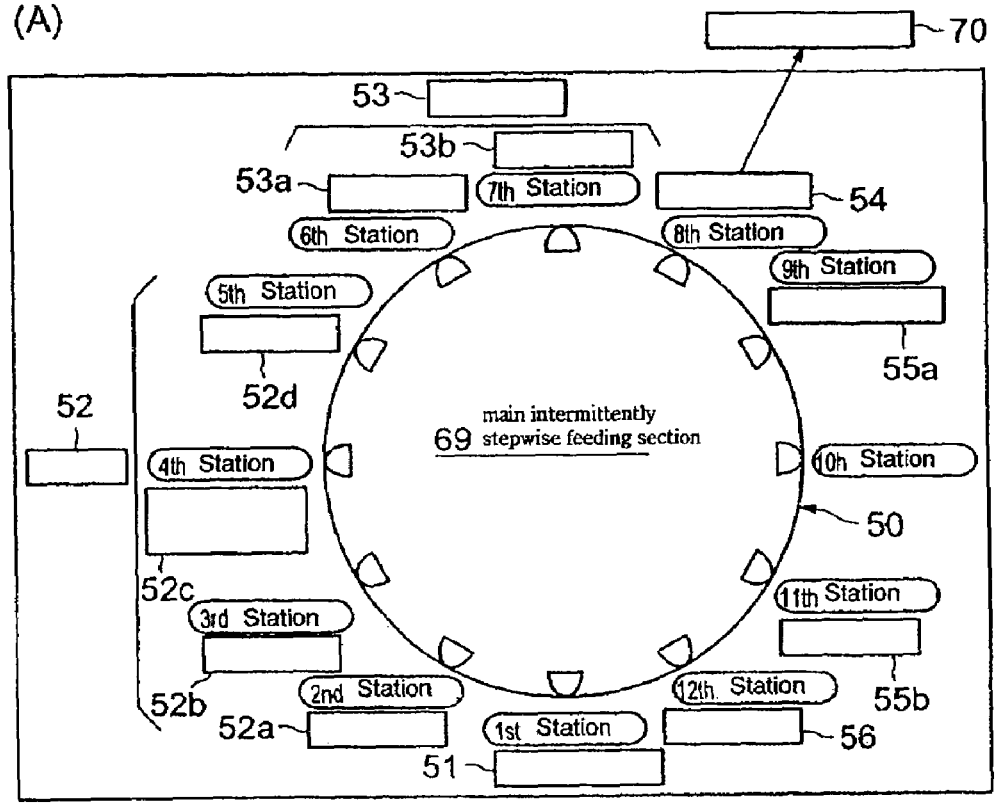
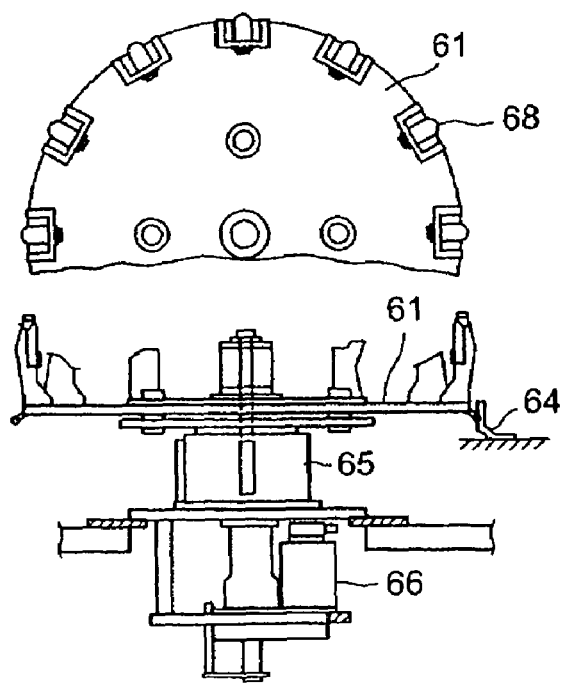

AUTOMATIC BONING SYSTEM OF UPPER HALF OF SLAUGHTERED EDIBLE FOWL

This is a divisional of U.S. application Ser. No. 11/150,826 having a filing date of 10 Jun. 2005 now U.S. Pat. No. 7,104,879 which is a continuation-in-part of International Application PCT/JP03/09166 having an international filing date of 18 Jul. 2003, which claims priority to PCT/JP02/12960 having an international filing date of 11 Dec. 2002; this International Application was not published in English, but in Japanese as WO 2004/052107.

TECHNICAL FIELD

The present invention relates to an automatic boning system of the upper half of a slaughtered edible fowl improved in yield, the system being composed such that the lower face of the shoulder joint of the slaughtered fowl is used as a reference plane for determining height position and a pushing member applied to the center part of the breast bone of the slaughtered fowl is used to set the direction of the slaughtered fowl relative to a reference direction in order to keep the right attitude of the slaughtered fowl during all the processes of boning including the process of charging the slaughtered fowl and the processes carried out after the same is charged, and scraping of breast meat together with the wing and succeeding scraping of white meat by making a white meat incision can be positively performed by cutting organic tissues such as tendons around shoulder joints, etc. accurately irrespective of the difference in size of each individual slaughtered fowl.

BACKGROUND ART

In recent years, the scales of raising, butchering, and processing of slaughtered body of edible beasts and birds are becoming larger, and a variety of automation is proceeding in those fields. In the past, separation of thighs from a slaughtered beast or bird has been done by hand work, recently inventions has been proposed concerning suitable methods and systems for boning slaughtered beasts and birds.

As to processing of thighs, a proposal concerning a boning system of the leg of an edible fowl is disclosed in Japanese Laid-Open Patent Application No.6-284854.

Said proposal aims to carry out automatically each step of separating the leg into meat and bones, which was conventionally carried out by hand work. The system consists of an apparatus for transferring legs, an apparatus for making an incision along the bones of the leg of the edible fowl, an apparatus for severing the leg at the knee joint to separate it into a thigh and a drumstick, an apparatus for pulling the thigh bone (femur) away from the thigh, an apparatus for stripping the drumstick of the meat around the tibia and fibula, and an apparatus for cutting tendons of the thigh. The leg is held at the ankle by the endless chain of said leg transferring apparatus so that the leg is kept substantially horizontal in order to carry out prescribed processes. Transfer means are provided for transferring the leg processed in the preceding apparatus to the succeeding apparatus.

A system of making incision in the meat along the bones of the leg of an edible fowl is disclosed in Japanese Laid-Open Patent Application No.7-39296.

According to said disclosure, the system is for making incision automatically in the meat of a thigh and drumstick along the bones of the leg. It is possible to make a cut along the thigh bone, knee joint, and bones of the drumstick by means of the rotation control means and rotation forcing and braking means of a cutting means.

As to boning of the upper half of a slaughtered chicken, proposals are disclosed in Japanese Laid-Open Patent Application No.11-266780 and No.2001-211818. The proposals disclosed in the references relate to a method and apparatus for automatic boning of the upper half of a slaughtered chicken, in which boning is done with increased yield complying automatically with the difference in size of each individual chicken and the difference in size of left and right side of the upper half of the chicken when the upper half of the slaughtered chicken is severed at the shoulder joint, breast meat is scraped away together with the wing, then the white meat is scraped away.

The proposal disclosed in the latter is an improvement of that disclosed in the former. In the latter proposal, the difference in size of each individual chicken and the difference in size of left and right side of the upper half of the chicken are coped with, and in addition the mixing of foreign matter into meat due to the crashing of the triangular bone (rear side protrusion of the breast bone) when scraping away the breast meat is completely eliminated and the white meat is scraped away smoothly without torn off of part of the white meat.

The automatic boning system of the upper half of a slaughtered chicken of said Japanese Laid-Open Patent Application No.11-266780 consists of a main intermittently stepwise feeding section 69 and a secondary intermittently stepwise feeding section 70 as shown in FIG. 21(A). The main intermittently stepwise feeding section 69 consists of a main intermittent feeder 50 and a group of stations of the first to $12^{th}$ station.

Said stations are located at positions outside the periphery of the main intermittent feeder 50 at a spacing of 30 degrees along the periphery, each of the stations facing toward the center of the feeder 50. On the $1^{st}$ station is provided a charging section 51 of an upper half of slaughtered chicken (hereafter referred to as a half body), on the $2^{nd}$~$5^{th}$ stations are provided pre-processing sections 52, among which a shoulder skin scraping section 52a being provided on the $2^{nd}$ station, a shoulder cutting section 52b being provided on the $3^{rd}$ station, a collar bone and ridge cutting section 52c being provided on the $4^{th}$ station, and a size measuring section 52d being provided on the $5^{th}$ station. On the $6^{th}$ and $7^{th}$ stations are provided shoulder joint separating sections 53, among which a shoulder tendon cutting section 53a being provided on the $6^{th}$ station, and an axilla part cutting section 53b being provided on the $7^{th}$ station. On the $8^{th}$ station is provided a breast meat scraping section 54, on the $9^{th}$ station is provided a white meat incision making section 55a, on the $11^{th}$ station is provided a white meat scraping section 55b, and on the $12^{th}$ station is provided a rib cage discharging section 56.

As shown in FIG. 22(B), said main intermittent feeder 50 is composed of a round table 61 which is provided with twelve attachment cones 68 in the periphery part of the table 61, a half body being to be fixed to each of the attachment cone; an stepping drive section 65 for rotating the round table 61 intermittently stepwise at an angle of 30 degrees; and a lifting mechanism 66 for lifting the table 61 every time the rotation of the table 61 is stopped. The drawing shows the state the round table 61 is lifted up to a determined position.

Each of the half body attachment cones 68 faces each of the stations when the round table 61 is stopped. Each of said attachment cone is provided with a shoulder support to support the half body from inside thereof, and a lock releaser 64 to release the locking of said shoulder support is provided at the rib cage discharging section 56 on the 12th station. The locking is released by the descent of the table 61 when the rotation of the table is stopped to enable the discharging of rib cage.

Said proposal of the automatic boning system of the upper half of slaughtered chicken of the invention disclosed in Japanese Laid-Open Patent Application No.11-266780 was improved by some inventors of the present invention and others in the invention disclosed in Japanese Laid-Open Patent Application No.2001-211818. However, there remain some aspects required to be further improved, particularly further endeavors are demanded to improve the pre-processing step including the charging step of the half body before boning, which will influence on the result of processing in the succeeding steps.

DISCLOSURE OF THE INVENTION

The present invention was made in light of aforementioned problems, and an object is to provide an automatic boning system of the upper half of slaughtered edible fowl with which the number of processing steps is reduced and boning can be performed with increased yield compared with the prior art of automatic boning system of the upper half of slaughtered chicken. Integrated control enabling various controlling by adopting a cam mechanism can be achieved in the present invention instead of linear, individual controlling of the prior art using hydraulic actuators.

Another object of the invention is to provide an automatic boning system of the upper half of slaughtered edible fowl in which the upper half of a slaughtered fowl with its skin stripped away is charged to a first station to be processed in succeeding stations sequentially.

The present invention proposes an automatic boning system of the upper half of a slaughtered fowl comprising a transfer body mounted with attachment cones to each of which the upper half of the slaughtered fowl (half body) is to be attached and stations for carrying out prescribed processing, the transfer body being advanced intermittently stepwise to stop when each of the attachment cones at each of the stations to allow the half body attached to each attachment cone to be processed as prescribed for each station, wherein to achieve reduction in the number of stations; a skin scraping step is provided for scraping the breast skin and side skin of the half body before the half body is fed to a half body charging step provided at a first station to be attached to the attachment cone, a half body fixing step is provided at a second station next to said first station for regulating and fixing the position of height and direction of the half body attached to the attachment cone to allow the half body to be rightly faced at each station when the attachment cone come at each station, by which the measuring station for measuring the inside size of the heads of left and right shoulder blade before cutting the tendon of the shoulder joint is omitted, and incisions which serve as a start of separation of meat from skin when ripping off meat is made along collar bones and around shoulder blades including part between the collar blades as a preprocess for a breast meat scraping step at the same station not at separate stations.

In making the present invention, pre-processing was reviewed to achieve the object of the invention to reduce the number of processing steps. As a result of the review, the shoulder skin scraping process of the prior art needed before carrying out pre-processing around the shoulders such as collarbone cutting, measurement, making incisions, etc. are omitted by providing the pre-processing step in which the half body is striped of the skin at the breast and both side parts and the shoulder skin is scraped to make the shoulder meat to be exposed as necessary before the half body is fed to the half body charging section where the half body is attached to the attachment cone.

As mentioned above, according to the present invention, the measuring step which was needed to cut the shoulder joint part that are different in size depending on each individual half body accurately in the succeeding sections of a shoulder tendon cutting section and an axilla cutting section, is omitted, and as mentioned later, when cutting the tendon of shoulder, the shoulder can be fixed to keep constant the width thereof irrespective of the difference in size of the individual half body and the slack in the skin of breast and both side parts by inserting a member of certain dimension in the inner side of the shoulder joint, resulting in that the cutting of tendon between the shoulder joint and the head of humerus can be made accurately.

Therefore, the axilla cutting process of the prior art in which the tendon under the shoulder joint is cut by making the shoulder joint to be exposed through pushing down the wings with meat pushing plates on the basis of the shoulder width data measured in the measuring section is omitted by providing the skin scraping process for scraping the skin of breast and both side parts before the half body is attached to the attachment cone and by improving the method of breast meat scraping. Further the system is composed to make incisions which serve as a start of separation of meat from skin when ripping off meat along collar bones and around shoulder blades including the part between the collar blades as a preprocess for a breast meat scraping step simultaneously. As a result, the number of processing steps is reduced from 12 steps in the prior art to 8 steps in the present invention.

Further, the present invention proposes a boning system comprising a transfer body in which the transfer body is a rotary disk mounted with attachment cones to each of which the upper half of a slaughtered fowl (half body) is to be attached and stations for carrying out prescribed processing, said rotary disk being rotated intermittently stepwise at an equal angles, said attachment cones being located on the peripheral part of said rotary disk so that each of said attachment cones comes at each of said stations located around said rotary disk when said rotary disk is stopped intermittently to allow the half body to be processed, wherein a driving system comprising cams and drive shafts driven by a driving source are provided in the upper top space above said rotary disk, and a plurality of operation links connected to said cams provided in said upper top space are extended downward to the work space above the rotary disk to be connected to processing members of said stations for regulating and fixing the attitude of the half body and processing the fixed half body.

Particularly, it is preferable that said driving system provided in said upper top space is composed of a vertical drive shaft connected to the driving source, a lengthwise drive shaft and a crosswise drive shaft connected to said vertical drive shaft, and a plurality of cams attached to the lengthwise and crosswise drive shafts, and said vertical drive shaft is connected to a drive shaft provided in the space below the rotary disk to allow said drive shaft to drive a driving device for driving the transfer body intermittently stepwise.

Therefore, according to the invention, by adopting integrated control by using a cam mechanism for controlling boning process in each station instead of linear and individual control of the prior art using hydraulic actuators, a variety of movement control with improved repeatability, synchronized motion, and intermittent motion are possible by a compact composition. As a variety of movement can be produced by adopting a cam mechanism instead of the control system of the prior art using mainly hydraulic actuators that produce linear motion, movements of some component members needed in the prior art can be omitted, and the construction of the mechanical elements is simplified.

Above invention describes the composition of the transfer body in the present invention, in which the transfer body is formed as a rotary disk and attachment cones to attach half bodies are located on the periphery part of the rotary disk at equal spacing so that the attachment cones faces the stations located around the periphery of the rotary disk, and the rotary disk is rotated intermittently stepwise to secure a certain time for processing the half body.

It is preferable that said attachment cone includes a shoulder stopper to determine a reference height position of the half body by allowing the stopper to contact the undersurface of the shoulder joint of the half body and a breast bone pusher supported elastically, and said breast bone pusher is pushed upward by a push rod located under the breast bone pusher against the force exerted to push down the breast bone pusher by an elastic member so that the top of the breast bone pusher contacts the center part of the breast bone of the half body.

In above invention, a shoulder stopper is provided so that the stopper contacts the undersurface of shoulder joint of the half body to determine a reference height position for the determination of right height position of the half body, and a breast bone pusher capable of moving up and down is provided for pushing to bite into the center part of breast bone from inside thereof in order to determine the direction of the half body to confine the fluctuation from side to side of the half body relative to the attachment cone after height position is determined.

In the invention, it is preferable that the cam mechanism is composed of a drive system including a motor, a plurality of cams provided to the drive system, and operation links, an end of each of the operation links being connected to each of the cam and the other end being connected to each of the members for processing each of the half bodies at each station.

Above invention describes the cam mechanism in the present invention, it is suitable for example that a drive system consisting of a plurality of drive shafts driven by a reduction motor as a driving source, a plurality of cams attached to the drive shafts to be located at the position facing to each station, and operation links connecting the cams to the ends of the processing members of the stations, and the drive system including the driving source is located in the upper top space above the rotary disk forming a circular transfer body.

By adopting the control system using said cam mechanism instead of the hydraulic control system of the prior art, movement control along a variety of curved lines becomes possible. Therefore, movement can be controlled to match the processing in each station to result in increased yield. Further, as the integrated control can be exercised through the cam mechanism mechanically and positively instead of complex controlling by means of a plurality of linear controlling members, improvement in repeatability, synchronized motion, intermittent motion, and stable operation for an extended period of time even in a highly humid atmosphere of the space for processing meat becomes possible.

In the present invention, it is preferable that the half body fixing section is provided with a forward tilting angled shoulder pusher which controls height position of the half body by pressing the shoulder of the half body attached to the attachment cone and pushes the breast bone pusher protruding outside into the inside of the half body to make a breast bone pusher bite into the center part of breast bone from inside thereof to control the direction of the half body.

Above invention describes the composition for determining the position of the half body attached to the attachment cone in the half body attaching section while controlling the height and direction position of the half body in order to allow the half body to face rightly to each processing section when the half body is transferred to come at each section (station). Said fixing of the half body is achieved by pressing the shoulder part by the forward tilting angled shoulder pusher, moving up the shoulder stopper integrated in the attachment cone to a determined height position, and allowing the breast bone pusher to bite into the center part of breast bone from inside. The half body is set to a determined height position by moving down the forward tilting angled shoulder pusher and pushing from above to make the protruding breast bone pusher to bite into the center inside the breast bone so that the half body is firmly fixed to the attachment cone.

Further, in the present invention, it is preferable that shoulder tendon cutting section is provided with a shoulder width regulating pusher to spread the shoulder width to a certain width and a pair of left and right cutters to cut the tendons at the shoulder joints.

Above invention describes the composition of a shoulder tendon cutting section before breast scraping. In this section, when cutting the tendon of shoulder, the shoulder width regulating pusher is moved down and inserted between the shoulder joints to spread the shoulder to a certain width before cutting the tendons with the cutters in order to eliminate the deviation of cutting position for individual half body depending on its size.

It is preferable in the invention that a breast meat scraping section is provided with a pair of wing raisers to lift up the flagging left and right wings, a pair of chucks to clasp each of the wings under the axilla thereof when each wing is lifted up, and a cam mechanism to move each of said pair of chucks along a curve to achieve the breast meat scraping with increased yield.

Above invention describes the composition of the breast meat scraping section. In this section, the breast meat is scraped away by clasping the root of the wing under the axilla, whereby the chuck is moved toward the front of the neck and then the chuck is pulled along a peculiar curve to scrape away the breast meat with increased yield.

When scraping the breast meat, the triangular bone is held down beforehand to prevent the bone from being crashed and mixed in the breast meat.

It is preferable that a white meat incision making section for making an incision to the white meat is provided with a shoulder pusher and a pair of knives provided on the both sides of the keel to insert into the adhesion part between the white meat and the surface of rib cage in order to cut down the adhesion part together with the thin membrane covering the white meat.

Above invention describes the composition of the section for making an incision to the white meat. The pair of knives are inserted sideways from both sides into the adhesion face of the white meat to the rib cage to make the incision between the white meat and rib cage before scraping the white meat.

In the invention, it is preferable that a section for scraping white meat and cutting the tendon of white meat is provided with a shoulder presser for determining the position of the root of shoulder top part of white meat, a chuck for pushing aside the collarbone by moving laterally the chuck from outside toward the center of the half body and holding the tendon of the top end part of white meat to scrape the white meat, and a cutter for cutting the root of the tendon at the top end part of white meat.

It is preferable in the invention that a rib cage discharging section is provided with a shoulder stopper capable of moving down for releasing the half body from the state it is fixed to the attachment cone, a breast bone pusher, a discharge bar to scoop up the rib cage, and a discharge bar to push away the rib cage toward a chute.

Above invention describes the composition of the rib cage discharging section. The section is composed so that the discharge of the rib cage is possible without lifting up the rotary disk by driving the discharge bars by means of the cam mechanism to push up and then push away the rib cage toward the chute.

By the way, the skin scraping process for scraping the skin of breast and both side parts of the half body before the half body is attached to the attachment cone at the half body charging section may be applied to other system insofar as the system is a system in which attachment cones to each of which the upper half of a slaughtered fowl(half body) is to be attached are provided to a transfer body and the transfer body is moved intermittently stepwise to transfer the attachment cones so that each of the attachment cone faces each station when the transfer body is stopped to allow each of the half body attached to each of the attachment cone to be automatically boned.

It is preferable that there is provided a transfer line before the half body charging section where the half body is attached to the attachment cone, on said transfer line being located sequentially a section to make incisions automatically to the back of the half body as pre-processing for skin scraping, a section to scrape the skin of the half body in a plurality of steps, and a section to charge automatically the half body stripped of skin to the attachment cone. It is preferable in this case that the half body is transferred with the breast side down on the transfer line, said plurality of skin scraping steps consist of a first step to strip the breast skin and a succeeding second step to strip both side skin near the root of each wing under the axilla except the skin on the back of the half body between the incisions made on the back, and an attitude correction guide is provided between the first and second step or in the second step for correcting the attitude of the half body collapsed during the skin scraping in the first step.

Further it is preferable that a pair of peeler rollers which is composed of two shafts each having s spiral groove in the outer circumference thereof and being rotated in the direction opposite to each other is used as a skin scraping means, one pair of peeler rollers is located with their rotation axes perpendicular to the transfer direction of the half body in the first step to strip the skin of the front face of breast part, and two pairs of peeler rollers are located with their axes of rotation parallel to the transfer direction of the half body in the second step to strip both side skin near the root of each wing under the axilla, the two pairs of peeler roller being located such that the two lines each connecting the rotation centers of each pair of rollers form the shape of a letter "V" when viewed in the transfer direction.

BRIEF DESCRIPTION OF THE DRAWINGS

FIG. 7(A),(B) are schematic representation of the ridge cutting section of the $3^{rd}$ station in FIG. 2, and FIG. 7(B) is that of the shoulder cutting section of the $3^{rd}$ station.

FIG. 20 is a detailed representation of the procedure of making incisions on the back of the half body among the skin scraping procedure shown in FIG. 15.

FIG. 22(A) is a plan view showing schematically the layout of stations in the automatic boning system of the upper half of slaughtered chicken of the prior art, and FIG. 22(B) is a representation showing schematically the composition of main intermittently stepwise feeding section of FIG. 22(A).

BEST MODE FOR EMBODIMENT OF THE INVENTION

A preferred embodiment of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

Figure 1:
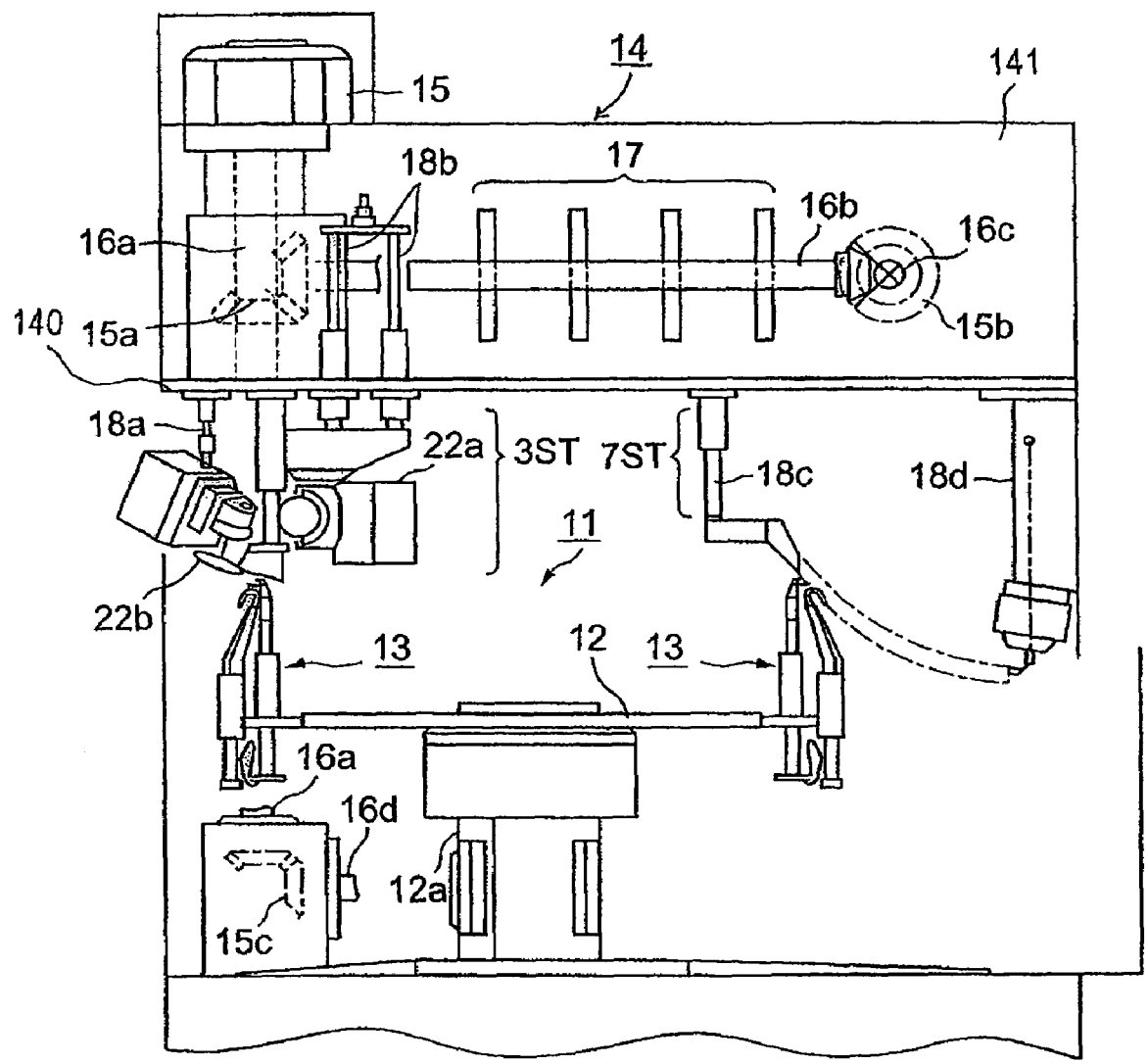
FIG. 1 is a side view of the automatic boning system of the upper half of a slaughtered fowl (half body) according to the present invention viewed in a direction indicated by arrows A—A in FIG. 2.
Figure 2:
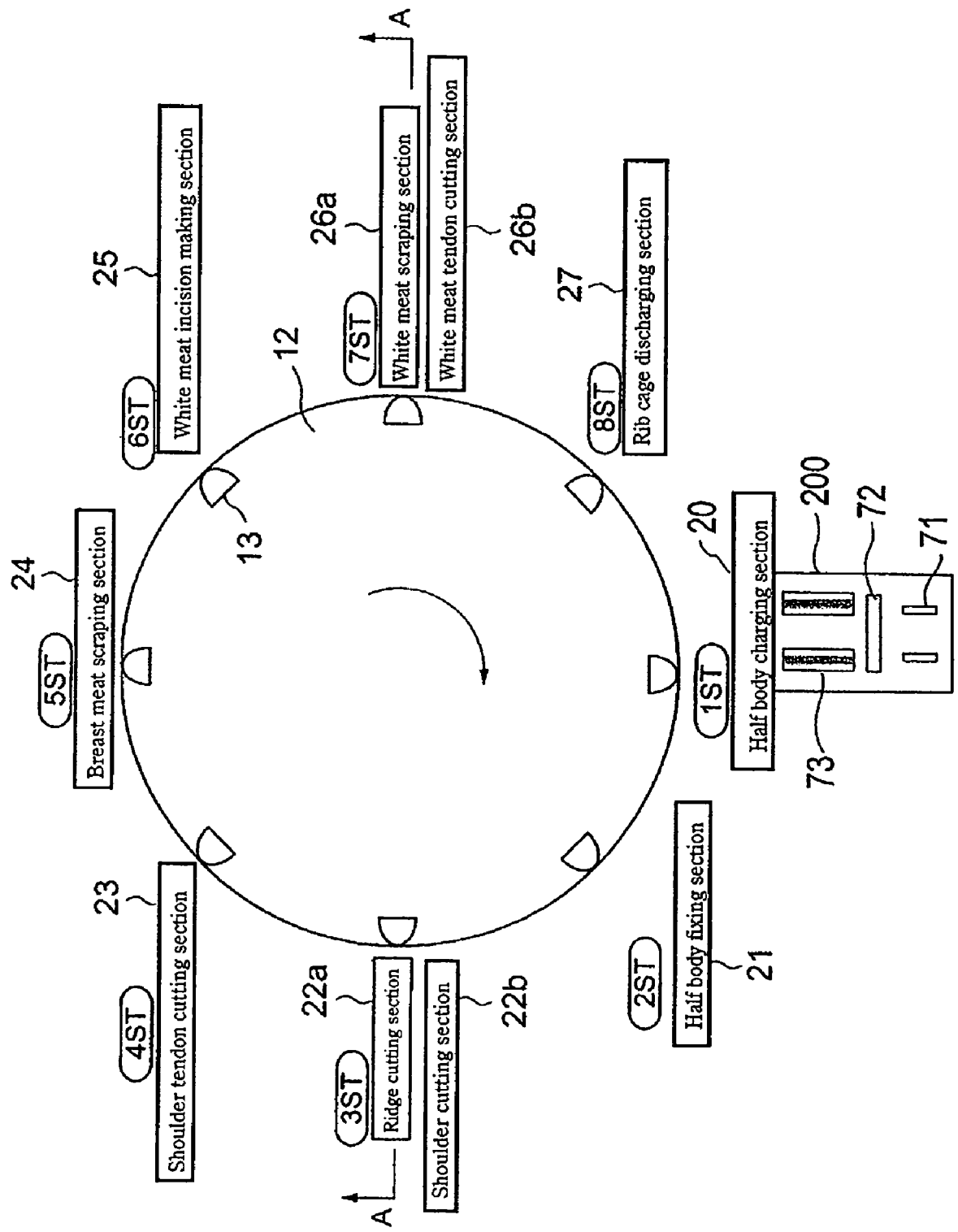
FIG. 2 is a plan view showing schematically the layout of stations shown in FIG. 1 together with a skin scraping step located adjacent to the half body charging section.
Figure 3:
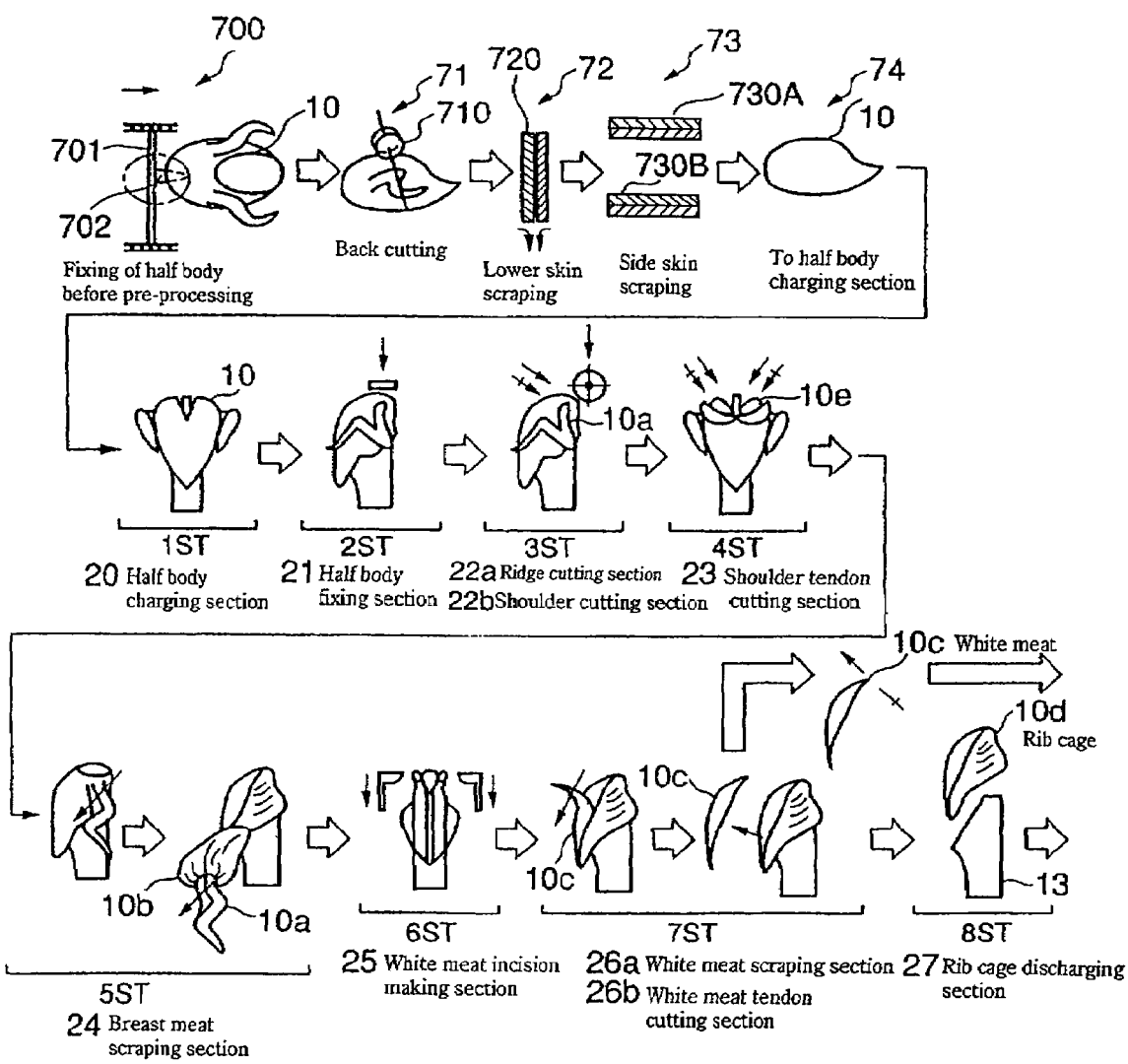
FIG. 3 is a schematic representation of processing at each station including the skin scraping section shown in FIG. 2.

FIG. 1 is a side view of the automatic boning system of the upper half of a slaughtered fowl according to the present invention viewed in a direction indicated by arrows A—A in FIG. 2, FIG. 2 is a plan view showing schematically the layout of stations shown in FIG. 1, and FIG. 3 is a schematic representation of processing at each station shown in FIG. 2.

As shown in FIG. 1, the automatic boning system of the upper half of a slaughtered fowl according to the present invention comprises a main intermittently stepwise feeding section 11, a group of eight stations, and a cam mechanism 14.

Said main intermittently stepwise feeding section 11 comprises a rotary disk 12 which is rotated intermittently stepwise at an angle of 45° by means of a stepwise driving device 12a, and eight attachment cones 13 located on the peripheral part of the disk 12 at a spacing of angle of 45°.

Said stations of a first to $8^{th}$ station where boning is carried out are positioned above the disk 12 corresponding to said attachment cones 13 so that necessary processes can be implemented to the half bodies fixed to the attachment cones 13 when the disk is intermittently stopped so that each of the attachment cones 13 comes below each of the stations.

Figure 19:
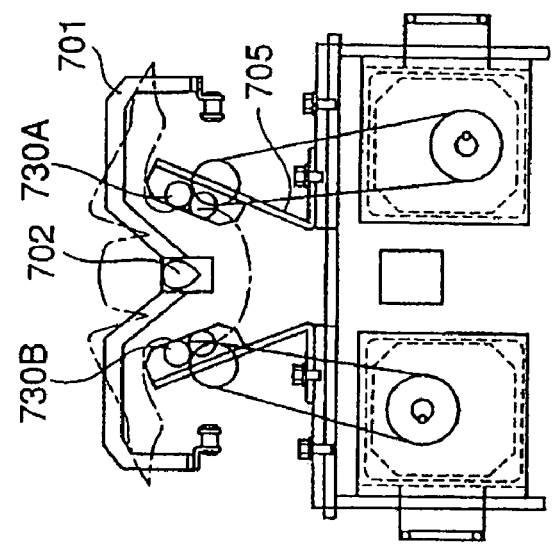
FIG. 19 is a sectional view along line A—A in FIG. 18 to show the sectional composition of the side skin scraping section.

A pre-processing station 200 is provided adjacent to the half body charging section 20 of the first station as is discerned in FIG. 2. As shown in FIG. 3, the pre-processing station(skin scraping section 200) is provided with a half-body-before-preprocessing fixing section 700 where the neck of the upper half of a slaughtered fowl 10 before pre-processing is attached to the protrusion 702 of a saddle 701; a back cutting section 71 where the skin is cut along the backbone by a pair of rotary round blade cutters 710 to prepare for skin scraping; a lower skin scraping section 72 where a pair of peeler rollers 720 of which the rotation axes are disposed perpendicular to the transfer direction of the half body 10, the peeler roller consisting of two shafts each having a spiral groove on the outer circumference thereof and peels off skin by the rotation thereof in a direction opposite to each other; a side skin scraping section 73 where the skin near the root of each wing (underside of the axilla) remained not scraped by the lower side skin scraping is scraped by two pairs of peel rollers 730A and 730B provided along the transfer direction of the half body 10 and disposed in the general shape of a letter "V" as shown in FIG. 19; and a charging section 74 where the half body 10 passed the side skin scraping section is adjusted in its attitude by means of a guide 750 (see FIG. 17) to be automatically fed to the $1^{st}$ station.

A half body charging section 20 is provided in the $1^{st}$ station where the half body is attached to the attachment cone 13; a half body fixing section 21 is provided in the $2^{nd}$ station where the half body attached to the attachment cone is regulated in its attitude and fixed on the attachment cone so that it is positioned at a determined height and directed radially outwardly; a ridge cutting section 22a and a shoulder cutting section 22b are provided in the $3^{rd}$ station, an incision being made on the back(part between shoulder blades) of the half body fixed to the attachment cone at the section 22a and a cut being made into the skin at the upper part of the shoulder (near collar bones) at the section 22b; a shoulder tendon cutting section 23 is provided in the $4^{th}$ station where severing is done between the shoulder joint 10e and the head of humerus; a breast meat scraping section 24 is provided in the $5^{th}$ station where the wings 10a separated from the shoulder joint by cutting the shoulder tendons are scraped together with the breast meat 10b; a white meat incision making section 25 is provided in the $6^{th}$ station where an incision is made into the thin membrane between the white meat and rib cage; a white meat scraping section 26a and a white meat tendon cutting section 26b are provided in the $7^{th}$ station, the tendon of the top end part of the white meat with an incision made into the thin membrane being clasped and pulled to scrape the white meat; and a rib cage discharging section 27 is provided in the $8^{th}$ station.

The half body 10 is processed and boned as shown in FIG. 3 in the main intermittently stepwise feeding section 11 in each of the stations when the rotation of the rotary disk 12 is intermittently stopped and the rib cage 10d is discharged in the last station.

Figure 4:
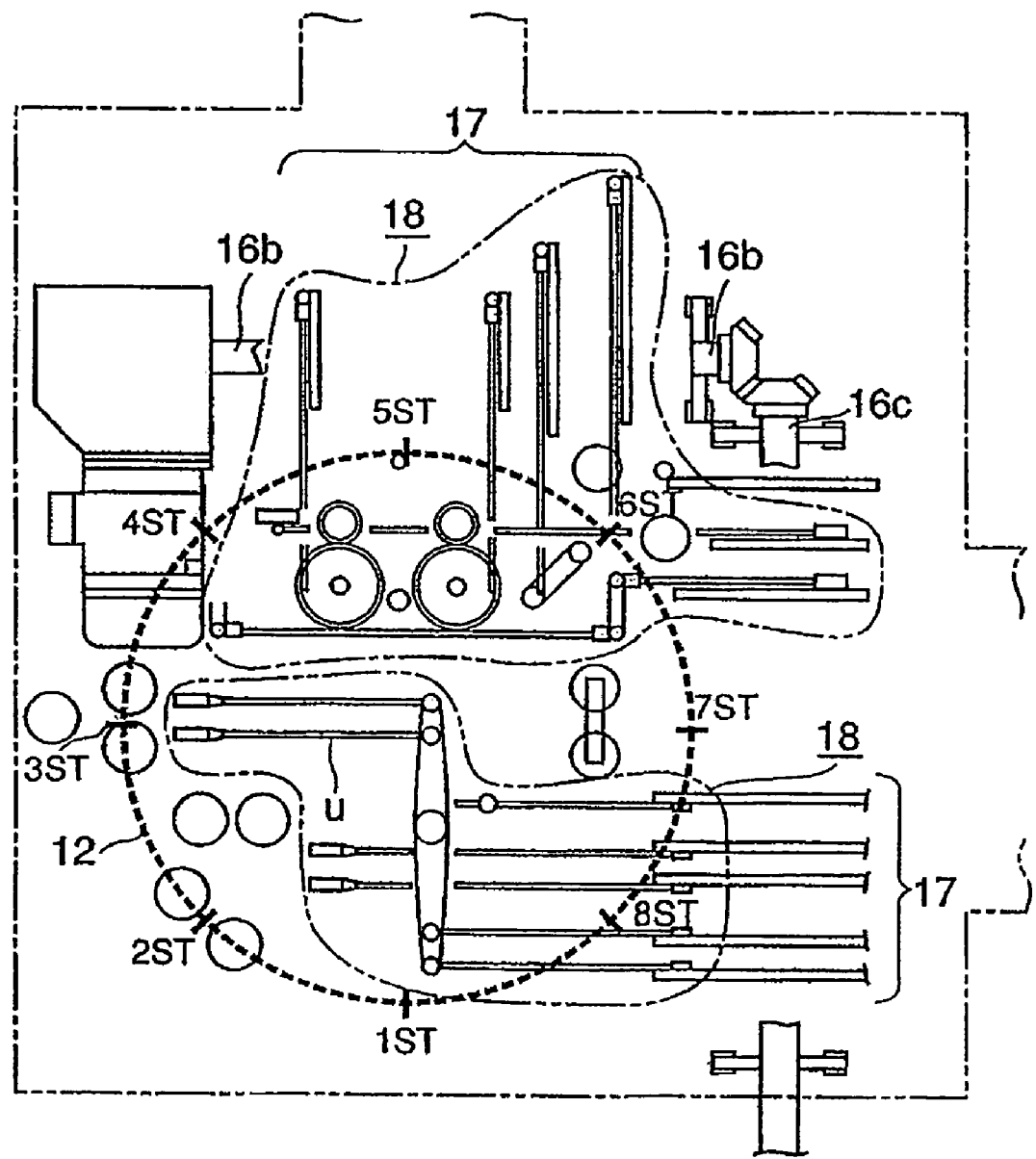
FIG. 4 is a schematic representation of the line-up of the integrated control using the cam mechanism of FIG. 1.
Figure 14:
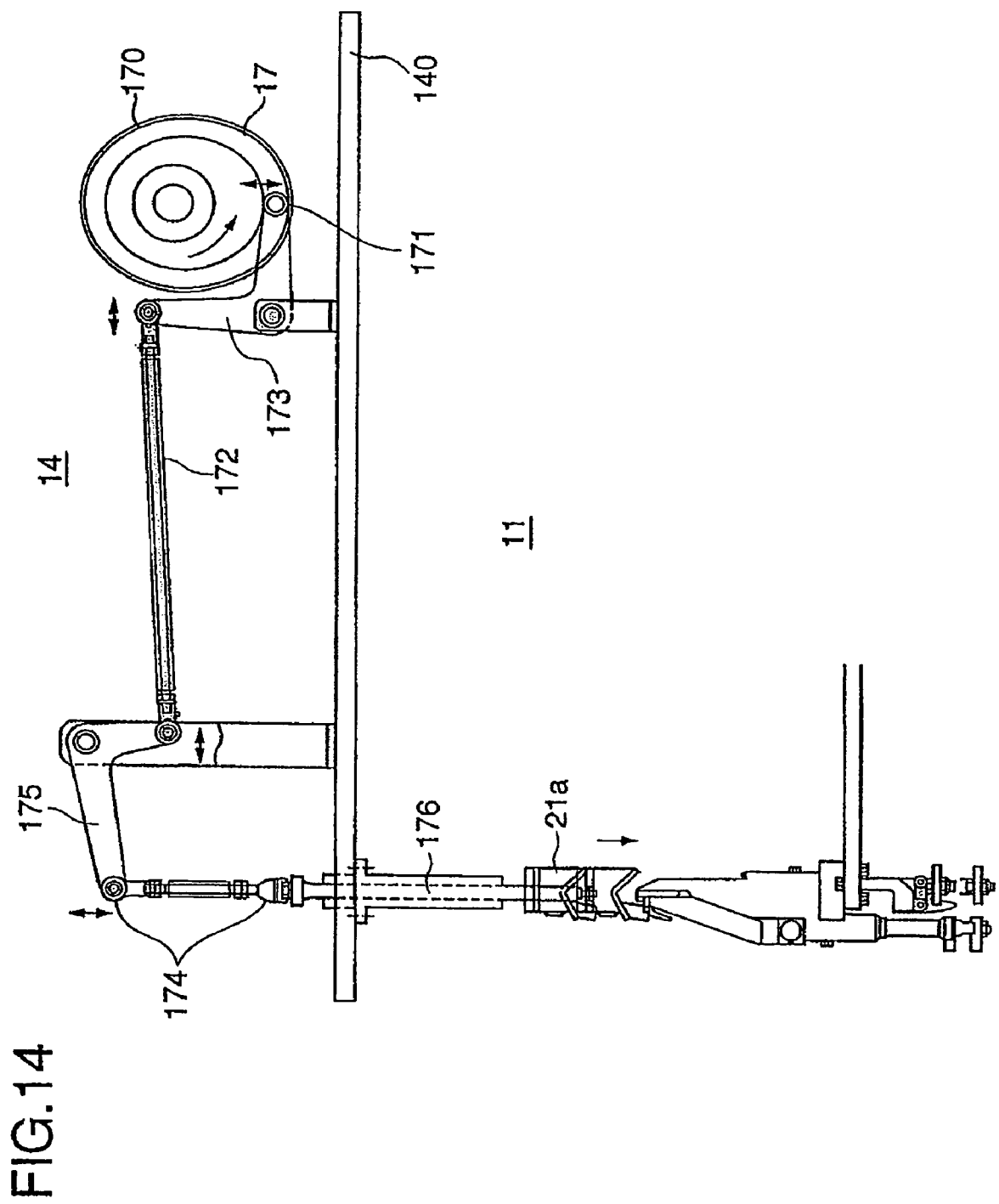
FIG. 14 is a schematic representation of the drive mechanism using the cam mechanism of FIG. 2 at the $2^{nd}$ station in FIG. 2.

FIG. 4 is a schematic representation of the line-up of the integrated control using the cam mechanism of FIG. 1, and FIG. 14 is a schematic representation of the drive mechanism using the cam mechanism of FIG. 2 at the $2^{nd}$ station in FIG. 2.

Said cam mechanism is located, as shown in FIG. 1, FIG. 4, and FIG. 14, in the upper top space 141 above the main intermittently stepwise feeding section 11. The cam mechanism consists of a driving group comprising a reduction motor 15 for driving the mechanism, a vertical drive shaft 16a, and a lengthwise and a crosswise drive shafts 16b and 16c which are connected to the vertical drive shaft 16a by way of bevel gears 15a and 15b; cam mechanism groups 17, 17 comprising a plurality of cams 170 and cam followers 171 attached to said drive shafts 16b and 16b to correspond to each of the stations; and operation link groups 18, 18 comprising levers and rods, an end of each of them being connected to each of the cam followers 171 and the other end of each of them is connected to each of the members for processing each of the half bodies.

In FIG. 1 is shown a side view viewed in a direction indicated by arrows A—A in FIG. 2. In the drawing, a vertical drive shaft 16a is provided to extend downward from the reduction motor 15; in the upper top space 141 is provided the lengthwise shaft 16b which is connected to the vertical shaft 16a by means of bevel gears 15a and the crosswise drive shaft 16c which is connected to said lengthwise drive shaft 16b by means of bevel gears 15b. The lower end of said vertical drive shaft 16a is connected to a crosswise drive shaft 16*d* by means of bevel gears 15*c*, and the rotary disk 12 is rotated intermittently stepwise by the rotation of the crosswise drive shaft 16*c* through transmission linkage not shown in the drawing connected to a stepwise driving device 12*a* to rotate the rotary disk 12 intermittently stepwise.

Operation links 18*a*, 18*b*, 18*c*, and 18*d* connected to each cam of the cam group 17 mounted to the lengthwise drive shaft 16*b* come down from the upper top space 141 to the main intermittently stepwise feeding section 11, and the operation link 18*a* and 18*b* are connected to the shoulder cutting section 22*b* and the ridge cutting section 22*a* in the $3^{rd}$ station respectively and the operation link 18*c* and 18*d* are connected to the white meat scraping section 26*a* in the $7^{th}$ station to operate each prescribed processing.

FIG. 14 is a schematic representation of the drive mechanism using the cam mechanism of FIG. 2 at the $2^{nd}$ station in FIG. 2. The composition of the cam mechanism, operation links, rods, and levers will be explained hereunder with reference to FIG. 14 as a representative example.

In the upper top space 141 above a ceiling 140 are located a cam mechanism comprising the cam 170 and cam follower 171, a first L-shaped lever 173 of which an end is connected to the cam follower 171 and the other end is connected to an end of a rod 172 to convert the vertical movement of the cam follower 171 to the lengthwise motion of the rod 172, and a second L-shaped lever 175 of which an end is connected to the other end of the rod 172 to convert the horizontal motion of the rod 172 to the vertical motion of the other end 174 of the L-shaped lever 175. The rod 174 of the L-shaped lever 175 is connected to a hoisting/lowering shaft 176 via an intermediate rod, and an angled shoulder pusher 21*a* can be hoisted or lowered by the means of the hoisting/lowering shaft 176.

A preferable stroke of the vertical movement of each of the hoisting and lowering shafts 176 is determined for each station by the cam mechanism 14 comprising the cams 170 and cam followers 171, operation links, rods, and levers. Therefore, a variety of strokes can be set to control the up-and-down or rotation motion to match for each of the stations, instead of the control system of prior art in which hydraulic actuators which produce reciprocating motion are mainly used. In addition to this, integrated control can be exercised by a single motor 15 mechanically and positively, and stable operation is possible for an extended period of time even in a highly humid atmosphere of the space for processing meat. Further, parallel controlling motion with other element members as is necessary in the conventional apparatuses can be eliminated in principle, resulting in a simple construction of the controlling components. As integrated control of whole of the controlling system can be done mechanically and positively, accuracy of repetition of control is improved, synchronizing motion and intermittent motion become possible, and stable operation for an extended period of time in a highly humid atmosphere is made possible.

Figure 15:
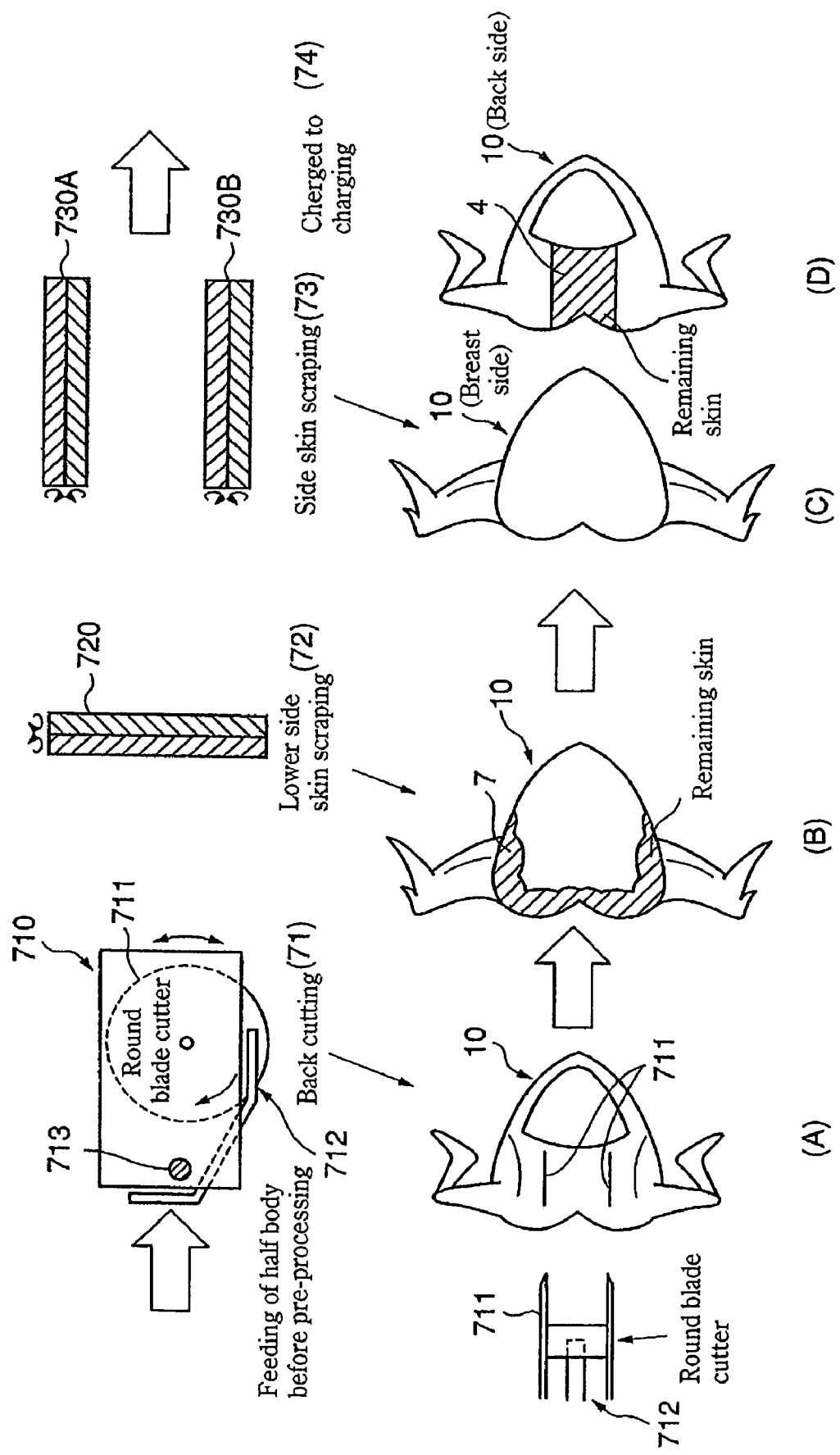
FIG. 15 is a drawing showing the flow of skin scraping process carried out as the pre-processing before the half body is attached to the half body charging section of the $1^{st}$ station.
Figure 16:
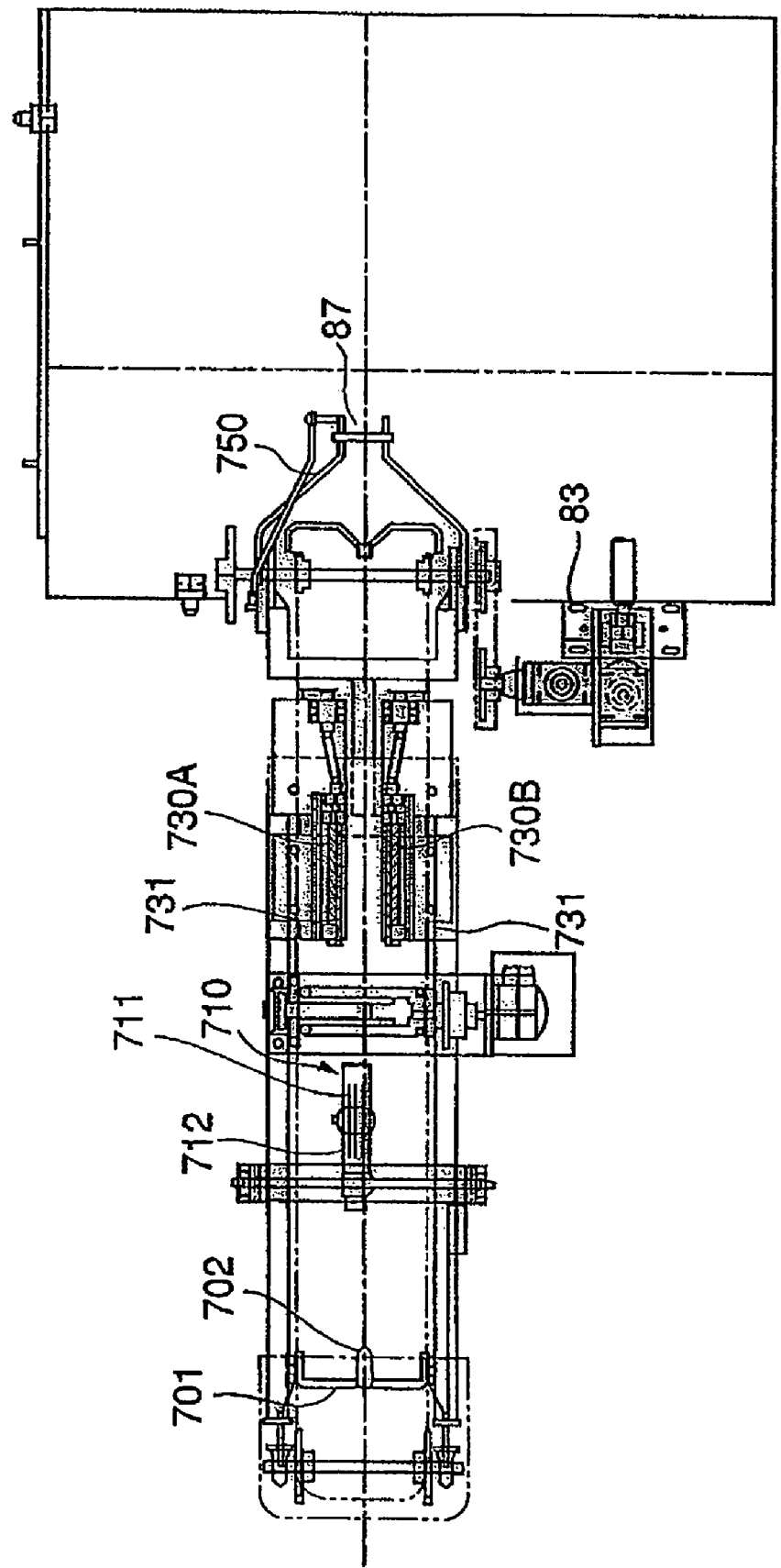
FIG. 16 is a plan view of the skin scraping section where the process shown in FIG. 15 is carried out.
Figure 17:
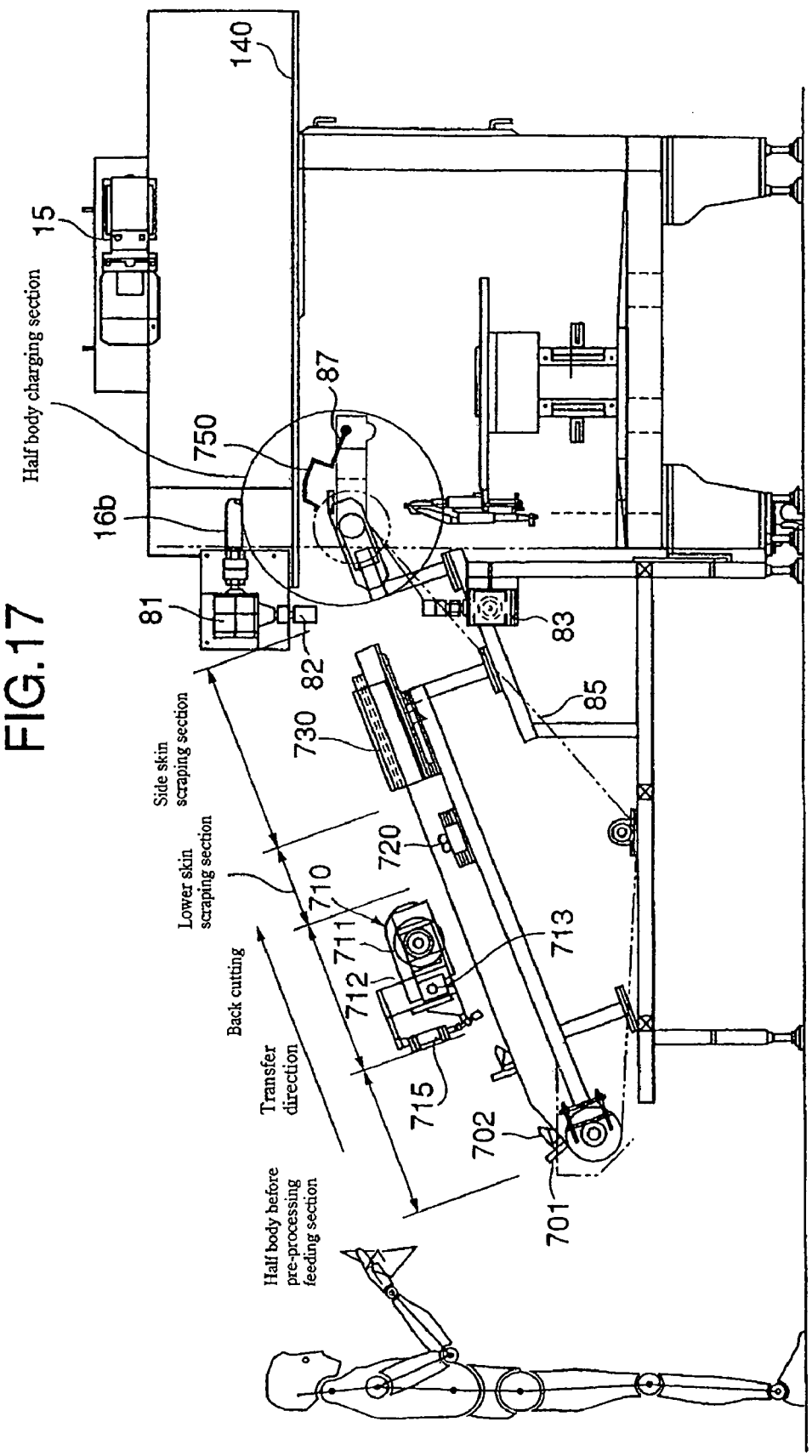
FIG. 17 is a side view of the skin scraping section where the process shown in FIG. 15 is carried out.
Figure 18:
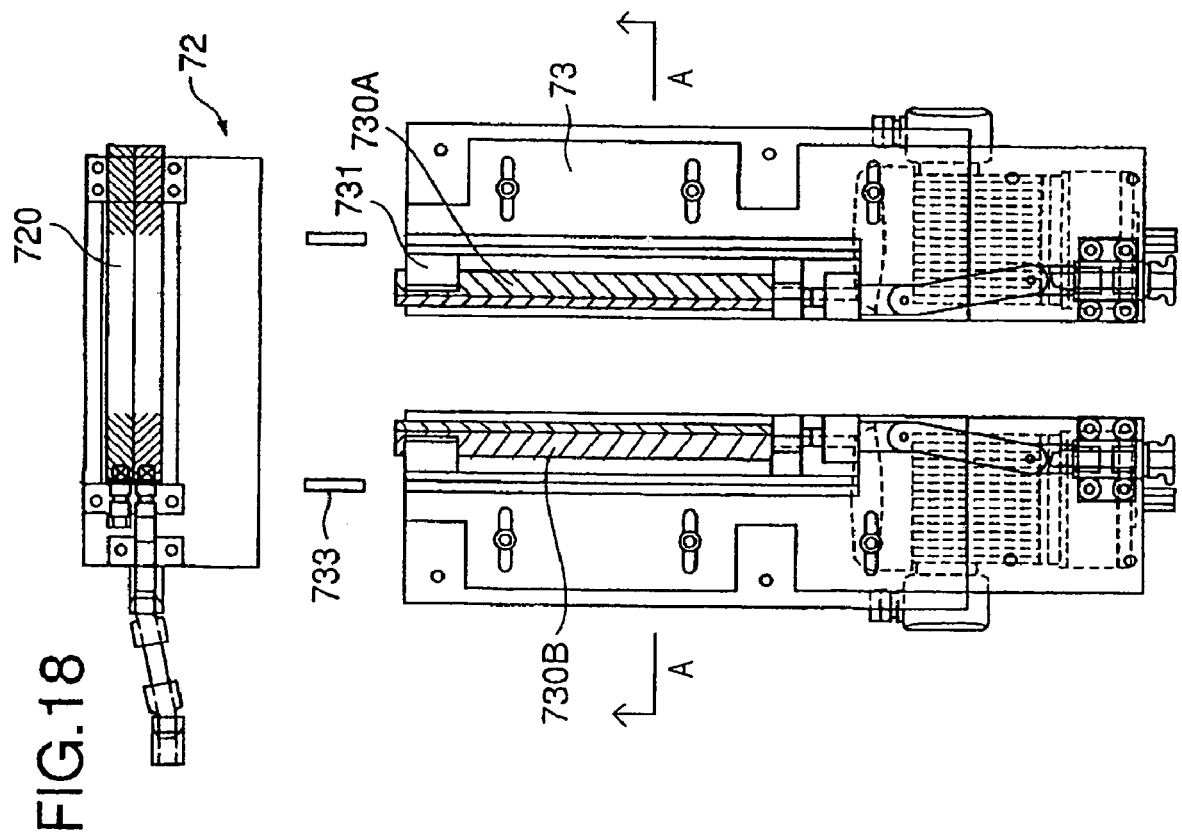
FIG. 18 is a partially enlarged view of the lower skin scraping section and side skin scraping section in the skin scraping section shown in FIG. 16 and FIG. 17.

FIG. 15–FIG. 19 show the skin scraping step as the pre-processing step before the half body is charged to the $1^{st}$ station. FIG. 15 shows the entire flow of the skin scraping process carried out as the pre-processing, FIG. 16 and FIG. 17 are respectively a plan view and side view of the skin scraping section. FIG. 18 is a partial enlarged view of the lower skin scraping section and side skin scraping section of the skin scraping section, and FIG. 19 is a sectional view along line A—A in FIG. 18 to show the sectional composition of the side skin scraping section.

Referring first to FIG. 17 which shows the layout of driving apparatuses in the skin scraping section, a gearbox 81 is located on the ceiling 140, a pair of bevel gears driven by the lengthwise drive shaft 16*b* connected to the reduction motor 15 being mounted in the gearbox 81, and rotation force is transmitted from the gearbox 81 to a gearbox 83 located in the main intermittently stepwise feeding section 11 by means of a vertical drive shaft 82 to drive a drive chain 85 in the skin scraping section via a transmission chain (not shown in the drawing).

Rectangular hook-shaped saddles 701 are attached to the drive chain 85, a half body attached to a protrusion 702 provided to each of the saddles 701 is charged onto the attachment cone 13 by utilizing the traveling of the drive chain and a guide 750 every time the attachment cone 13 stops intermittently at the $1^{st}$ station.

The chain 85 proceeds diagonally rising to the right in FIG. 17 from the position a worker feeds the half body before pre-processing, and along the chain are provided from the worker side a half body feeding section, a back cutting section, a lower skin scraping section, a side skin scraping section, and a half body charging section, and a corresponding tool is located and fixed in each of the section.

1) Half Body Before Pre-processing Feeding Section

The worker sticks the neck of the upper half of a slaughtered fowl(half body) before pre-processing to the protrusion 702 provided to the saddle 701 when the saddle 701 connected to the drive chain 85 comes to the half body before pre-processing feeding space to fix it. The body before pre-processing is transferred to the back cutting section by the saddle 701 traveling continuously.

2) Back Cutting Section

In the back cutting section is provided as shown in FIG. 20 a pair of round blade cutters 710 which is composed of two round blade cutters 711 and a leaf spring-like blade edge guide 712 supported by a guide supporter 718 so that only the blade edges of the pair of cutters 710 are protruded from the blade edge guide 712 to allow the pair of cutters 710 to cut only the skin of the half body. The pair of round blade cutters 710 is supported to be swung around center of the shaft 713 supported by the guide supporter 718, and the guide supporter 718 is extended in the direction opposite to the pair of round blade cutters 710 from the center of the shaft 713 and an air cylinder 715 is connected to the extended part 718*a* for balancing, i.e. to lighten the force applied to the skin by the weight of the cutter side members.

With the composition like this, the ridge of the back skin can be cut for carrying out pre-processing of skin scraping while accommodating to the difference in size of individual upper half of the slaughtered fowl by the swing of the pair of round blade cutter 710 together with the blade edge guide 712. By providing the air cylinder 715, the force applied to the back of the slaughtered fowl is lightened so that only skin is cut without applying excess force to the back.

3) Lower Skin Scraping Section

A pair of peeler rollers 720 which consists of two shafts, each shaft having a spiral groove on the outer circumference thereof, their rotation axes being disposed perpendicular to the transfer direction of the half body, and each shaft being rotated in a direction opposite to each other, is positioned under the lower face of the half body to scrape away the skin of the front face of breast part. (In FIG. 15, (B) is a view from the lower face (breast side) of the half body and the skin remaining after the lower skin scraping is shown as a hatched part 7.)

4) Side Skin Scraping Section

In the side skin scraping section, two pairs of peeler rollers 730A and 730B provided along the transfer direction of the half body are mounted to V-shaped walls 705 (see FIG. 19) respectively, the upper shaft touching the wider range of the side skin and the lower shaft touching the narrower range of the side skin. The skin near the root of each wing(underside of the axilla) remained not scraped by the lower side skin scraping is scraped by said two pairs of peeler roller 730A, 730B mounted to the V-shaped walls 705. The directions of spiraling of the spiral grooves and the directions of rotation of the shafts are determined as shown in FIG. 15. Guides 731 are provided at the entrance side of the pairs of peeler roller. With the configuration like this, the half body does not contact the stripped skin directly, and fat is prevented from adhering to the half body. Attitude correction guide 733 are provided between the lower skin scraping section and side skin scraping section for correcting the attitude of the half body collapsed by the skin-scraping in the lower skin scraping section to prepare for side skin scraping. The attitude correction guides 733 are formed of a pair of erect plates located symmetrically inside the crosswise span of the drive chains as is discerned in FIG. 18.

By the side skin scraping, the side skin is removed all over the breast side as shown in FIGS. 15(C) and (D), and on the back side only the skin 4 is remaining inside of the incisions made in the back cutting section.

5) Half Body Charging Section

The half body processed in the side skin scraping section is corrected in its attitude by a guide member 750 to be automatically charged to the boning line. The guide member 750 is supported by a shaft 87 located ahead of the upper end of circulation of the drive chain 85 so that the guide member can be swung upward around the center axis of the shaft 87, the guide member being formed such that the width is reduced gradually in the tip side.

Figure 5:
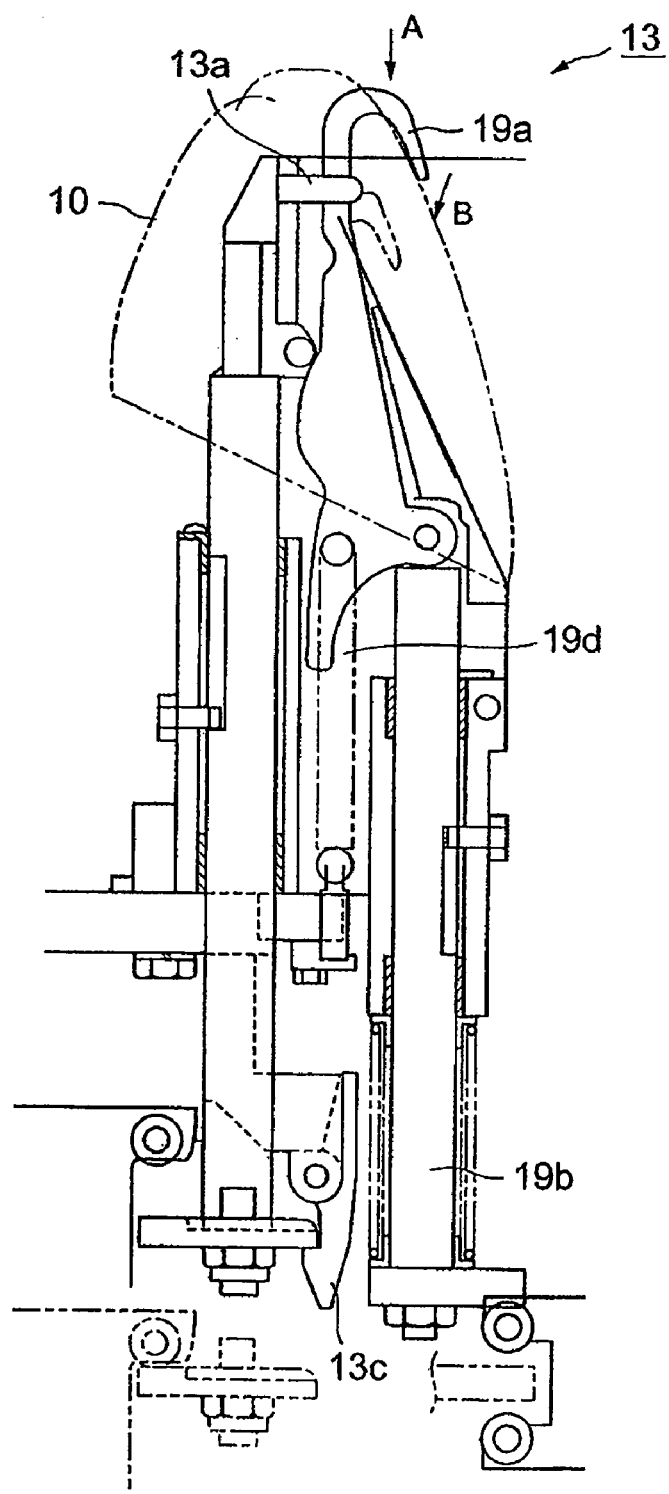
FIG. 5 is a schematic representation of the half body attachment cone mounted to the round table of FIG. 2 corresponding to each station.

In FIG. 5 is shown schematically the attachment cone 13, to which the half body is to be attached, mounted to the rotary disc 12 of the main intermittently stepwise feeding section 11. As is shown in the drawing, the attachment cone 13 is composed such that it has a shoulder stopper 13a connected to an upright rod which can be moved up and down and locked in a certain position by a locking claw 13c located in the lower part thereof, and a breast bone pusher 19a having a narrow, curved portion capable of being pulled downward by an elastic element 19d and pushed upward by a push rod 19b against the force pulling the breast bone pusher 19a downward, the top(hook part) of the breast bone pusher 19a being able to be moved down in the direction of arrow B. The half body 10 is attached to the attachment cone 13 so that the center part of the breast bone contacts the top of the breast bone pusher 19a in the state as shown by the chain double dashed line in the drawing.

Figure 6:
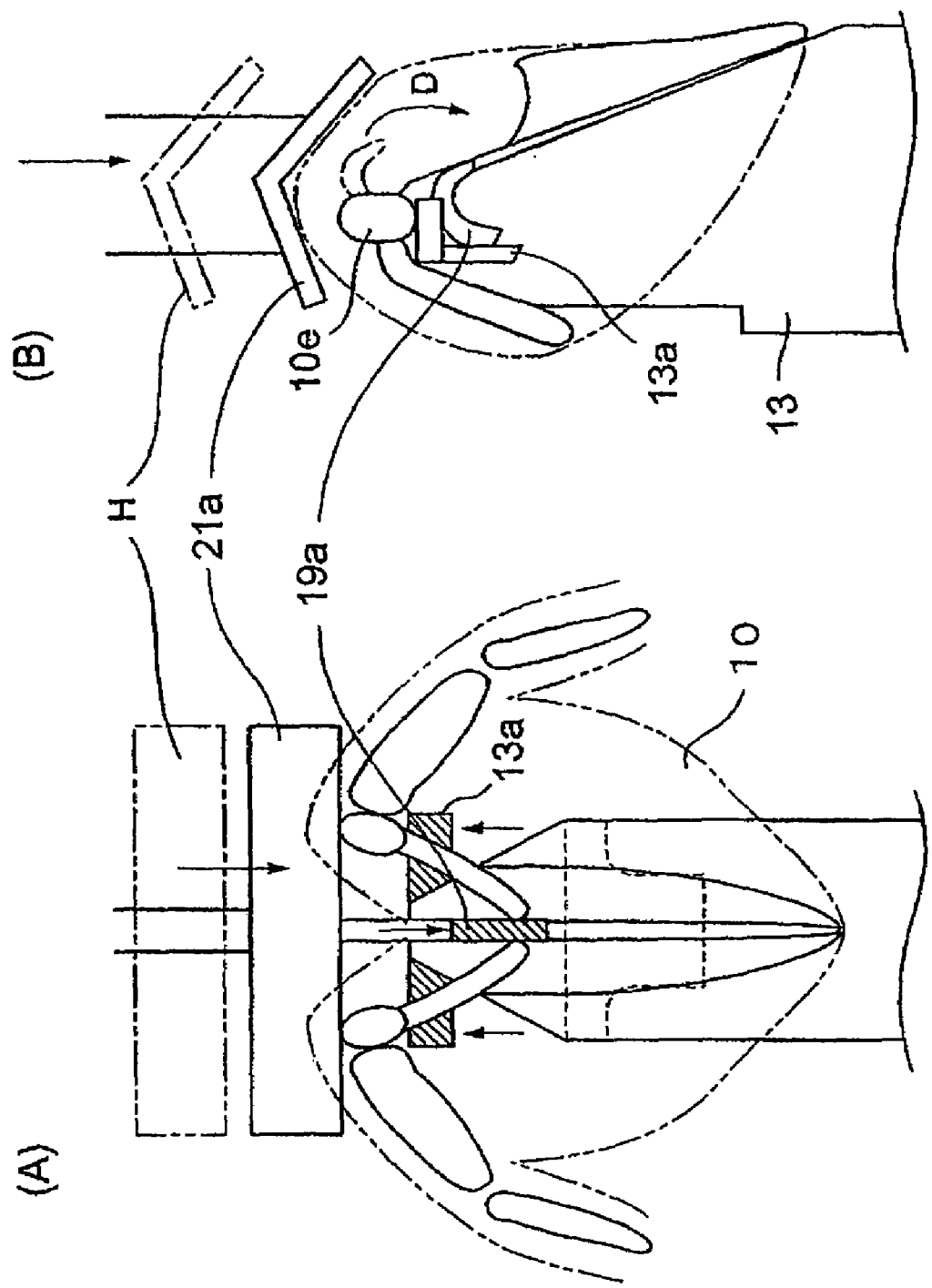
FIGS. 6(A),(B) are schematic representation of the half body fixing section of the $2^{nd}$ station in FIG. 2, FIG. 6(A) showing the state the half body is fixed viewed from the front side and FIG. 6(B) being a side view of FIG. 6(A).

FIGS. 6(A),(B) are schematic representation of the half body fixing section of the $2^{nd}$ station in FIG. 2, FIG. 6(A) shows the state that the half body is fixed viewed from the front side, and FIG. 6(B) is a side view of FIG. 6(A). Referring to FIGS. 6(A) and (B), the shoulder stopper 13a and the breast bone pusher 19a of the attachment cone 13 are moved down to a position lower than a determined position H. In this state, the half body 10 is attached and an angled shoulder pusher 21a is moved down to press the half body 10 from above.

The shoulder stopper 13a and the breast bone pusher 19a are moved up in accordance with said pressing of the half body 10, said shoulder stopper 13a is locked at the determined position H with the lower end of the shoulder joint 10e of the half body 10 contacted with the shoulder stopper 13a to determine the height position of the half body.

On the other hand, the breast bone pusher 19a which has been lifted up as shown by the chain line is moved down in the direction of arrow D, and the pusher 19a presses the center part of the breast bone of the half body 10 while descending to regulate the half body to a right direction. That is, the half body is determined in vertical position by the shoulder stopper 13a and in horizontal direction by the breast bone pusher 19a so that processing such as cutting, etc. can be carried out accurately.

FIG. 7(A) is a schematic representation of the ridge cutting section 22a of the $3^{rd}$ station in FIG. 2, and FIG. 7(B) is a schematic representation of the shoulder cutting section 22b of the $3^{rd}$ station. In FIG. 7(A), a round blade cutter 27b is moved up and down to make incisions along the ridge (part between shoulder blades) of the half body 10. A spring not shown in the drawing is used to keep the force exerted from the cutter nearly constant in order to prevent the depth of the incision to become not too deep. By making an incision in the center of the back along the thoracic vertebrae, the starting cut line for separating the meat and skin of the back to left and right side is formed.

In the shoulder cutting section 22b shown in FIG. 7(B), an incision is made aslant into the meat near the top of the shoulder (near collar bones) in order that the meat is scraped away smoothly from the incision when scraping the meat. The treatment proceeds as follows: First, a shoulder pusher 22c having a slanted portion is moved down to a certain position to stabilize the half body 10 by pushing the shoulders thereof, whereby up-and-down and right-to-left orientation of the half body is determined simultaneously. The shoulders are deformed in conformance with the shape of the shoulder pusher 22c, and the pusher 22c provides a reference position.

Then, round blade cutters 22d, 22d are reciprocated forward and backward to cut the meat of shoulders aslant. The distance t between the cutter 22d and the shoulder pusher 22c is determined to be a certain value. The pressing force of the cutter is adjusted by a spring not shown in the drawing. The cutter feeding mechanism not shown in the drawing is composed such that the cutter draws back when the blade edge thereof contacts the bone, thus the difference in size of individual half body can be accommodated. Said distance t is preferable to be 3~5 mm.

Figure 8:
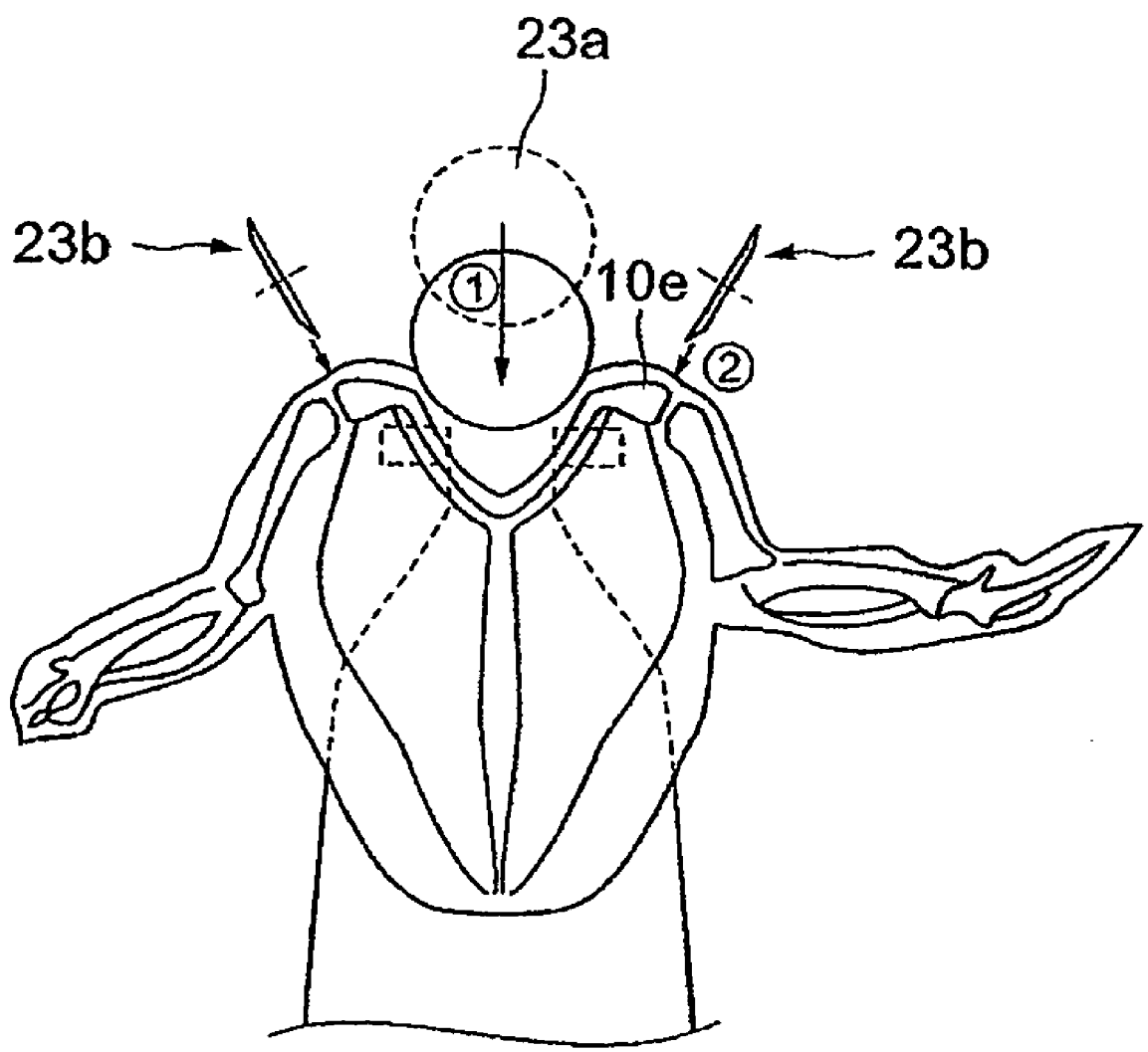
FIG. 8 is a schematic representation of the shoulder tendon cutting section of the $4^{th}$ station in FIG. 2.

FIG. 8 is a schematic representation of the shoulder tendon cutting section 23 of the $4^{th}$ station in FIG. 2. As is shown in the drawing, a shoulder width regulating pusher 23a is moved down as indicated by arrow ① to a certain position to expand shoulders to a certain spread so that the connecting position of the shoulder joint 10e with the head of humerus is set at a certain position to compensate for the difference in size of individual half body. Then tendon cutting cutters 23b are advanced as indicated by arrow ② to said connecting position.

Figure 9:
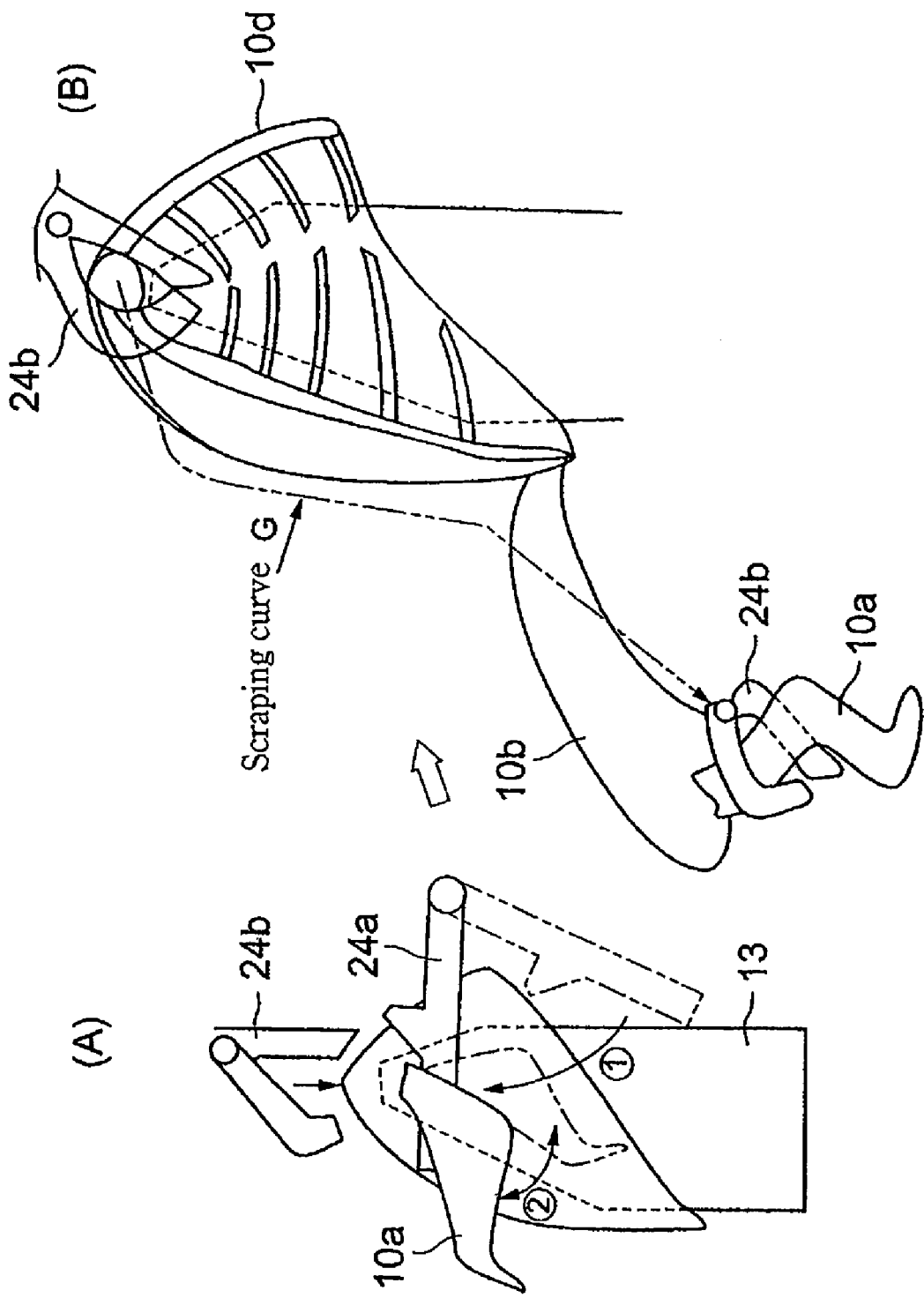
FIG. 9(A) are schematic representation of the breast meat scraping section of $5^{th}$ station in FIG. 2.
FIG. 9(B) is a drawing showing how the breast meat is scraped away.

FIG. 9(A) are schematic representation of the breast meat scraping section of $5^{th}$ station in FIG. 2, and FIG. 9(B) is a drawing showing how the breast meat is scraped away. The breast meat 10b is scraped away together with the wing 10a in this section by clasping both right and left wings 10a with chucks and pulling apart. As shown in FIG. 9(A), there are provided a pair of wing raiser 24a, 24a each of which lifts up the wing 10a by swinging upward, and a pair of chucks 24b, 24b each of which clasps the root of the wing of which a gap is formed under the axilla by lifting up the wing.

The wing raiser 24a is swung in a direction indicated by arrow ①  to bring it to the underside of axilla in order to rotate the wing 10a as indicated by arrow ② whereby a gap is formed under the axilla. Then the chuck 24b with its claws open is moved down to clasp the root of the wing. Then the chuck 24b clasping the wing 10a is moved down along a curve G shown by a chain double dashed line by means of the cam mechanism. In this way, the breast meat 10b and wing 10a are scraped with increased yield.

Figure 10:
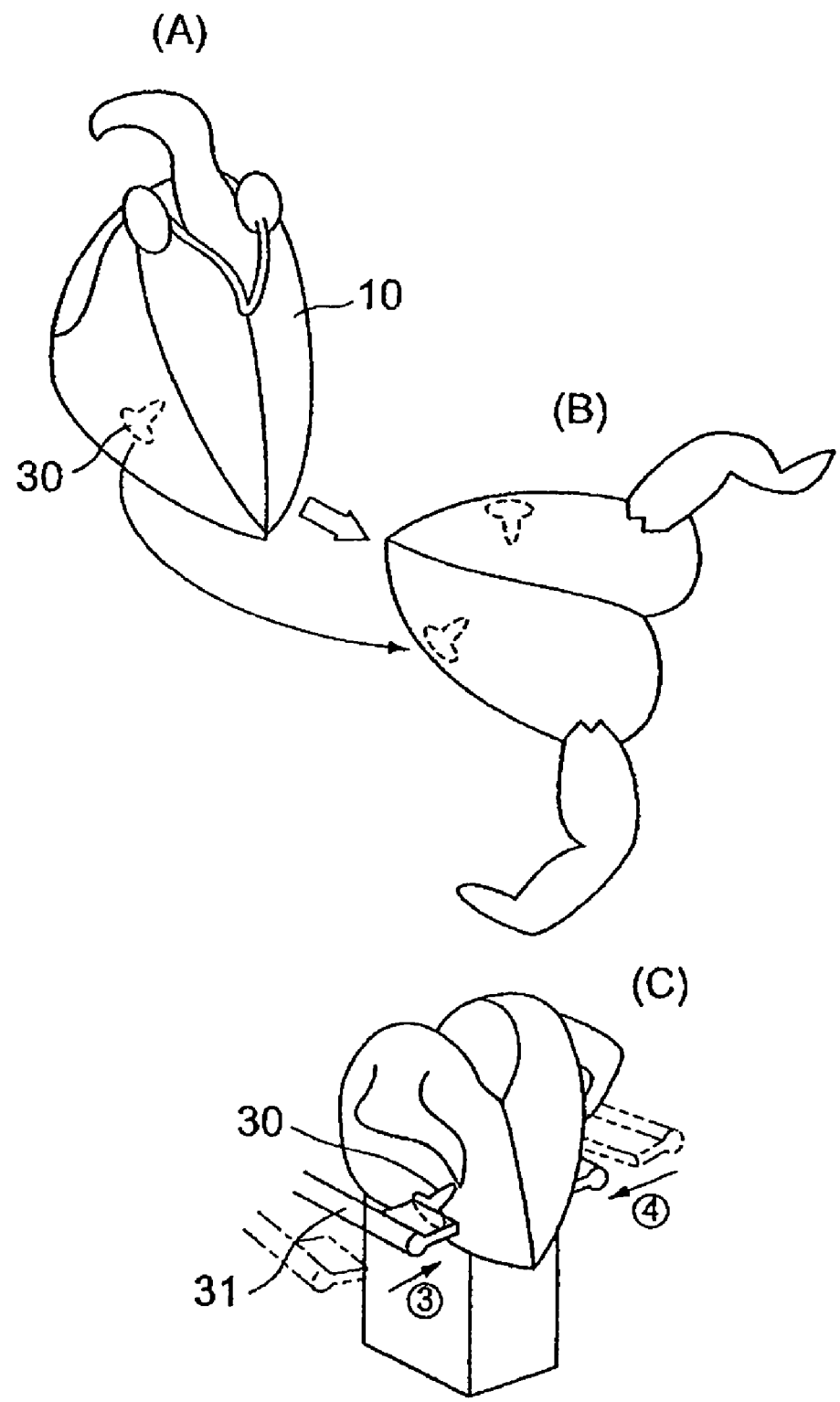
FIG. 10(A),(B), and (C) are drawings for explaining the prevention of mixing of the triangular bone in the breast scraping section of the $5^{th}$ station in FIG. 2, (A) is a drawing to show the position of the triangular bone, (B) is a drawing showing the state the crashed pieces of the triangular bone crashed when scraping away the breast meat are mixed into the flesh, and (C) is a drawing showing the state the triangular bone is held down by triangular bone pressers before scraping the breast meat in order to prevent the mixing of the crashed triangular bone into the flesh.

There has been a problem that the triangular bones 30 which are the extremity parts of the branches extending obliquely rearward from the caracoid are broken off and mixed into the scraped meat as shown in FIGS. 10(A) and (B). To solve the problem, triangular bone pushers 31 are provided to push the triangular bones 30 in directions indicated by arrows ③, ④ before the scraping is carried out in order to prevent the triangular bones from being broken off when scraping the breast meat and wings.

Figure 11:
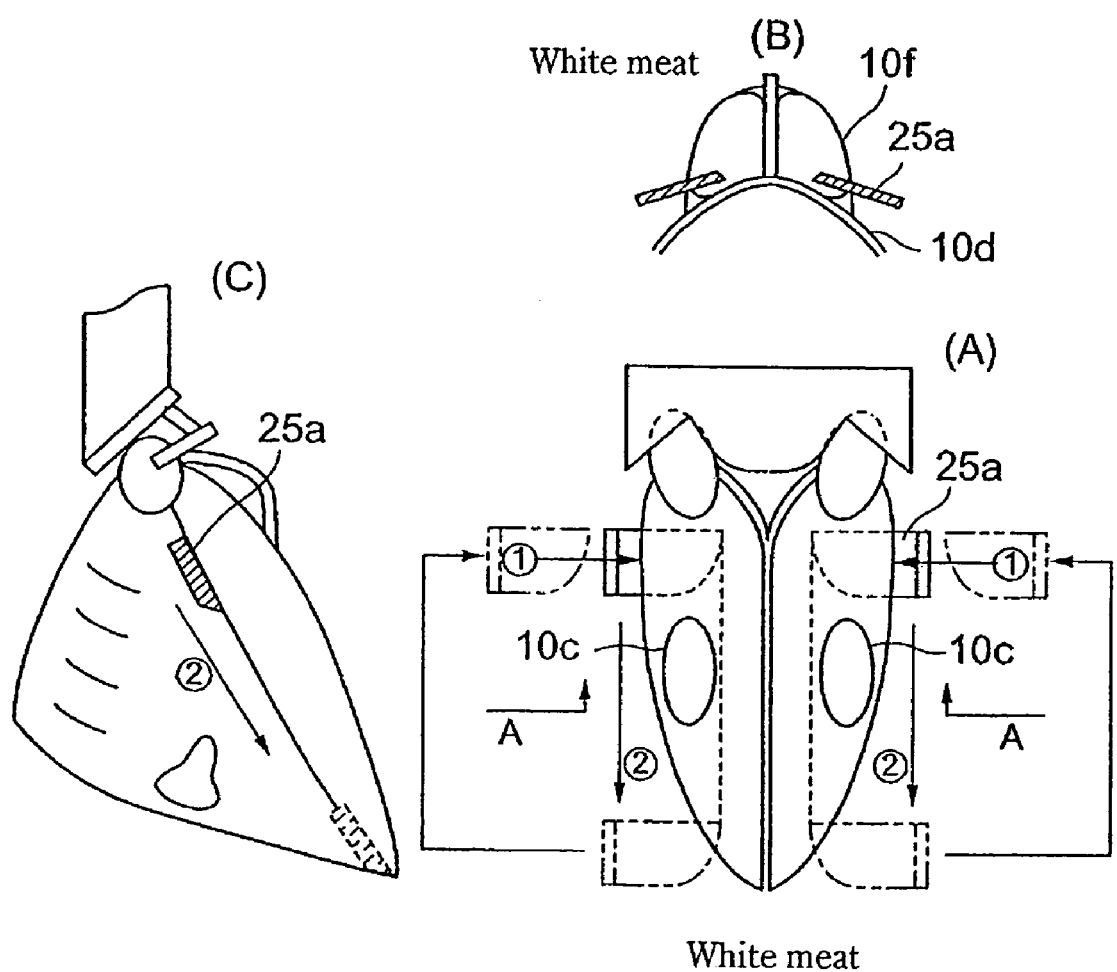
FIG. 11(A) is a plan view showing the state knives are inserted to make incisions at the $6^{th}$ station in FIG. 2.
FIG. 11(B) is a rear view in the direction of arrows A—A in FIG. 11(A), and FIG. 11(C) a side view of the FIG. 11(A).

FIG. 11(A) is a plan view showing the state that knives are inserted in the white meat incision making section 25 at the $6^{th}$ station in FIG. 2, FIG. 11(B) is a rear view in the direction of arrows A—A in FIG. 11(A). As shown in the drawings, knives 25a are inserted from both sides of the half body along the surface of the rib cage 10d.

In this section, the thin membrane 10f covering the surface of the white meat 10c and the adhesion part of the white meat to the rib cage are cut by making an incision along the surface of the rib cage 10d by the knife 25a in order to ease the succeeding white meat scraping. The process is as follows: First, the knife 25a is inserted through the thin membrane 10f between the white meat 10c and the rib cage 10d as indicated by arrow ① in FIG. 11(A). Then the knife is moved down along the rib cage 10d in the direction indicated by arrow ② by means of said cam mechanism to cut said adhesion part.

Figure 12:
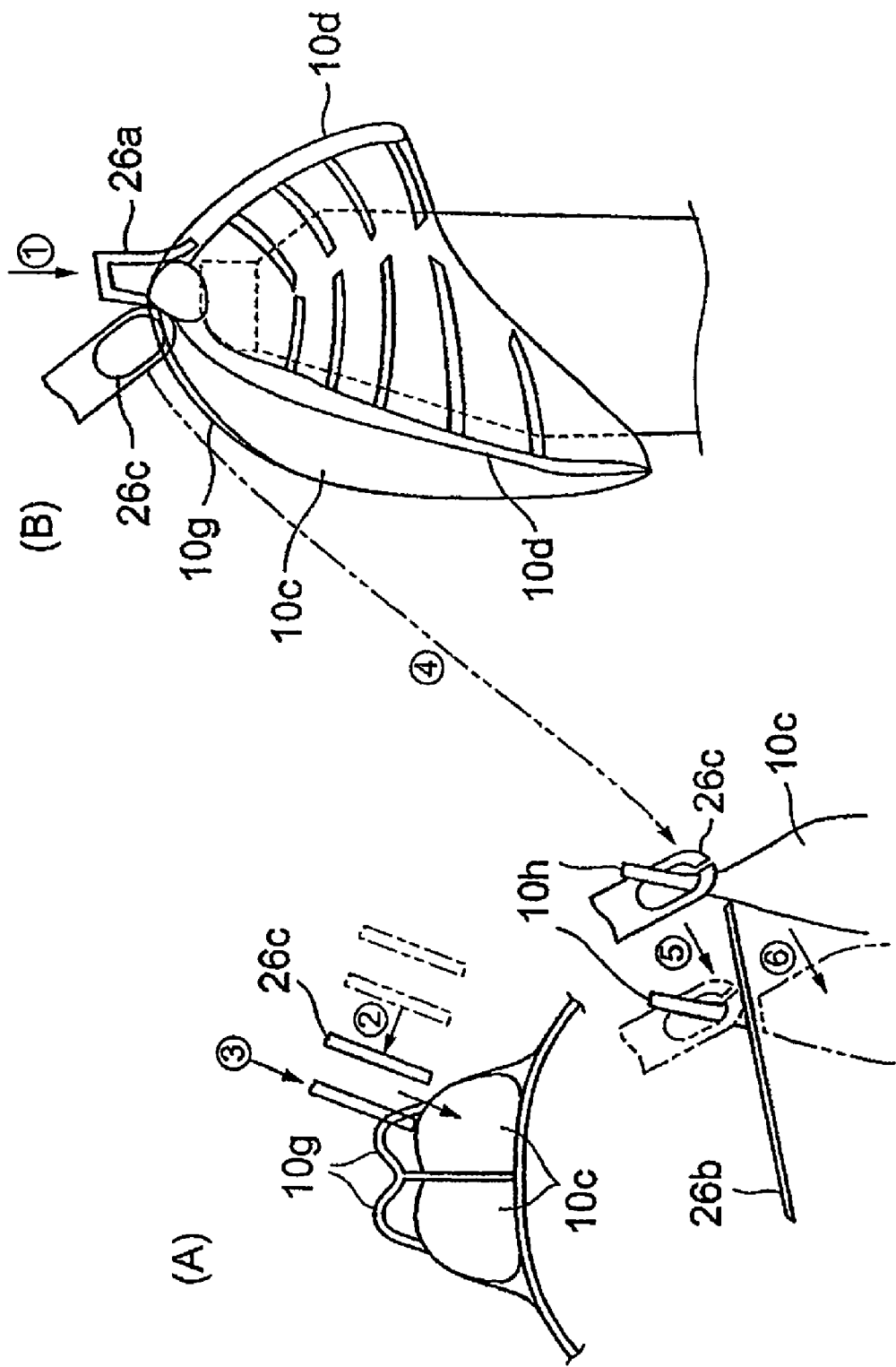
FIG. 12(A) is a drawing showing the state a chuck clasps the tendon at the front end of the white meat at the $7^{th}$ station in FIG. 2.
FIG. 12(B) is a drawing showing the state the tendon at the front end of the white meat is cut and the white meat is scraped away.

In FIGS. 12(A), (B) are shown the process in the white meat scraping section 26a and the white meat tendon cutting section 26b in the $7^{th}$ station in FIG. 2. In these sections, the top part of the white meat to which the incision was made in the proceeding section is clasped by a chuck and pulled to be scraped away, and then the tendon at the top of the white meat is cut. First, a shoulder presser 26a is moved down in the direction indicated by arrow ① in FIG. 12(B) to determine the position of the shoulder top, then the end of a chuck 26c is moved in the direction indicated by arrow ② in FIG. 12(A) to push aside the collarbone 10g to allow the top of the white meat to be exposed. Then the end of said chuck 26c is moved down in the direction indicated by arrow ③ so that the tendon 10h of the top part of the white meat 10c passes trough the ring of the end of the chuck 26c. Then the chuck 26c is moved down along a chain double dashed line ④ as shown in FIG. 12(B) by means of the cam mechanism to scrape away the white meat. Then the tendon 10h of the top part of the white meat is cut by a cutter 26b, and the tendon 10h and white meat 10c are separated respectively in the direction indicated by ⑤ and ⑥.

Figure 13:
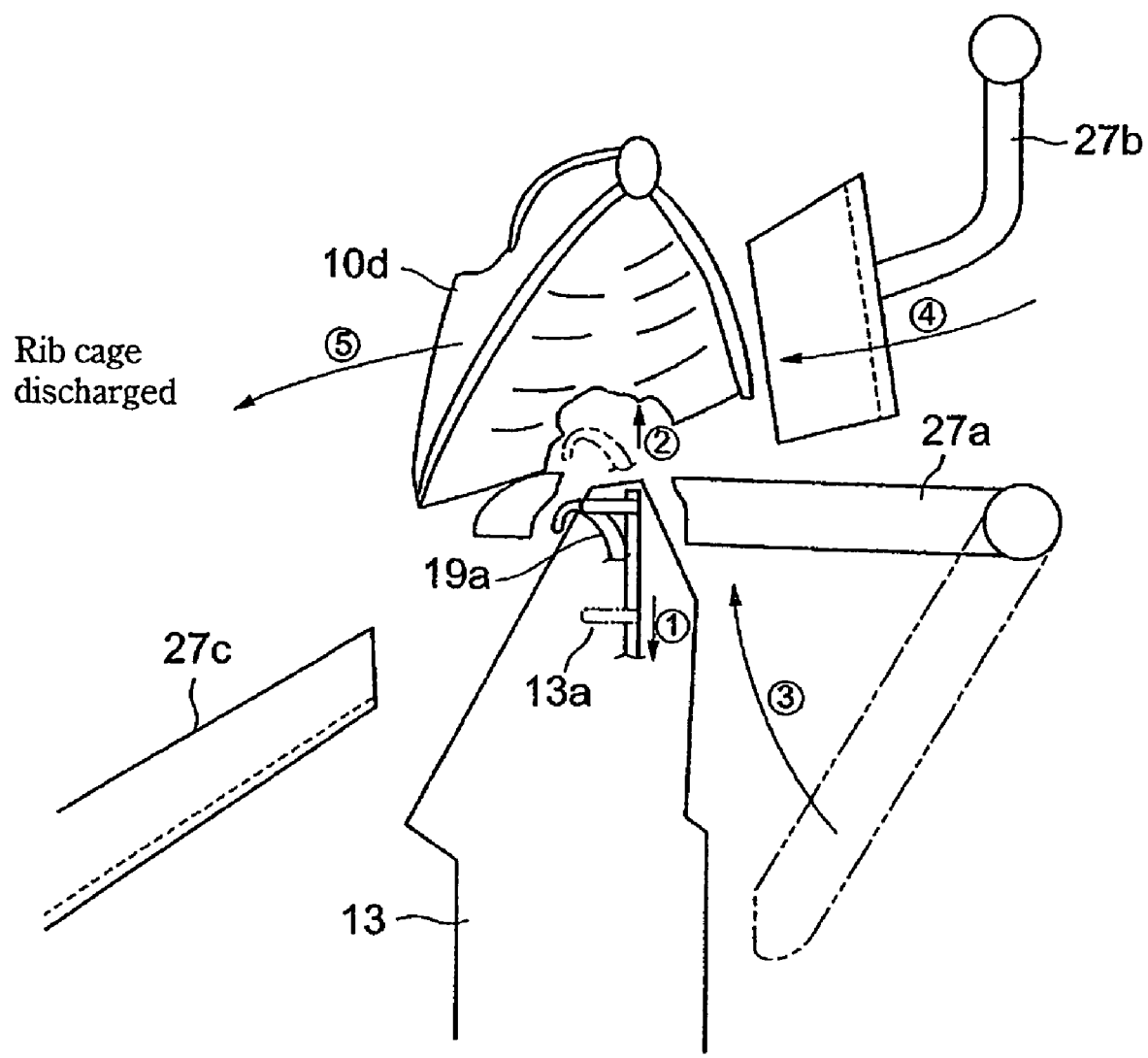
FIG. 13 is a drawing showing the state the rib cage is discharged at the $8^{th}$ station in FIG. 2.

FIG. 13 is a drawing showing the state the rib cage is discharged in the rib cage discharging section 27 at the $8^{th}$ station in FIG. 2. As shown in the drawing, the rib cage discharging section 27 is provided with a discharge bar 27a, a discharge bar 27b, and a shoot 27c. When discharging the rib cage 10d, first the lock (not shown in the drawing) of the shoulder stopper 13a of the attachment cone 13 is unlocked and the attachment cone 13 is moved down in the direction indicated by ①. Then the breast bone pusher 19a is moved upward in the direction indicated by arrow ② to allow the pusher 19a to depart from the rib cage 10d, then the attachment cone 13 is moved down. Then the discharge bar 27a is swung upward in the direction indicated by arrow ③ to scoop up the rib cage 10d to remove it from the attachment cone 13. Then the discharge bar 27b is moved in the direction indicated by arrow ④ to push out the rib cage 10d in the direction indicated by arrow ⑤, and the rib cage 10d is discharged to the shoot 27.

A collar bone part incision making section 42a and a meat of shoulder blade part scraping section 42b shown in FIGS. 21(A), (B), and (C) may be provided at the $3^{rd}$ station in stead of the ridge cutting section 22a and shoulder cutting section 22b of FIG. 7.

Figure 21:
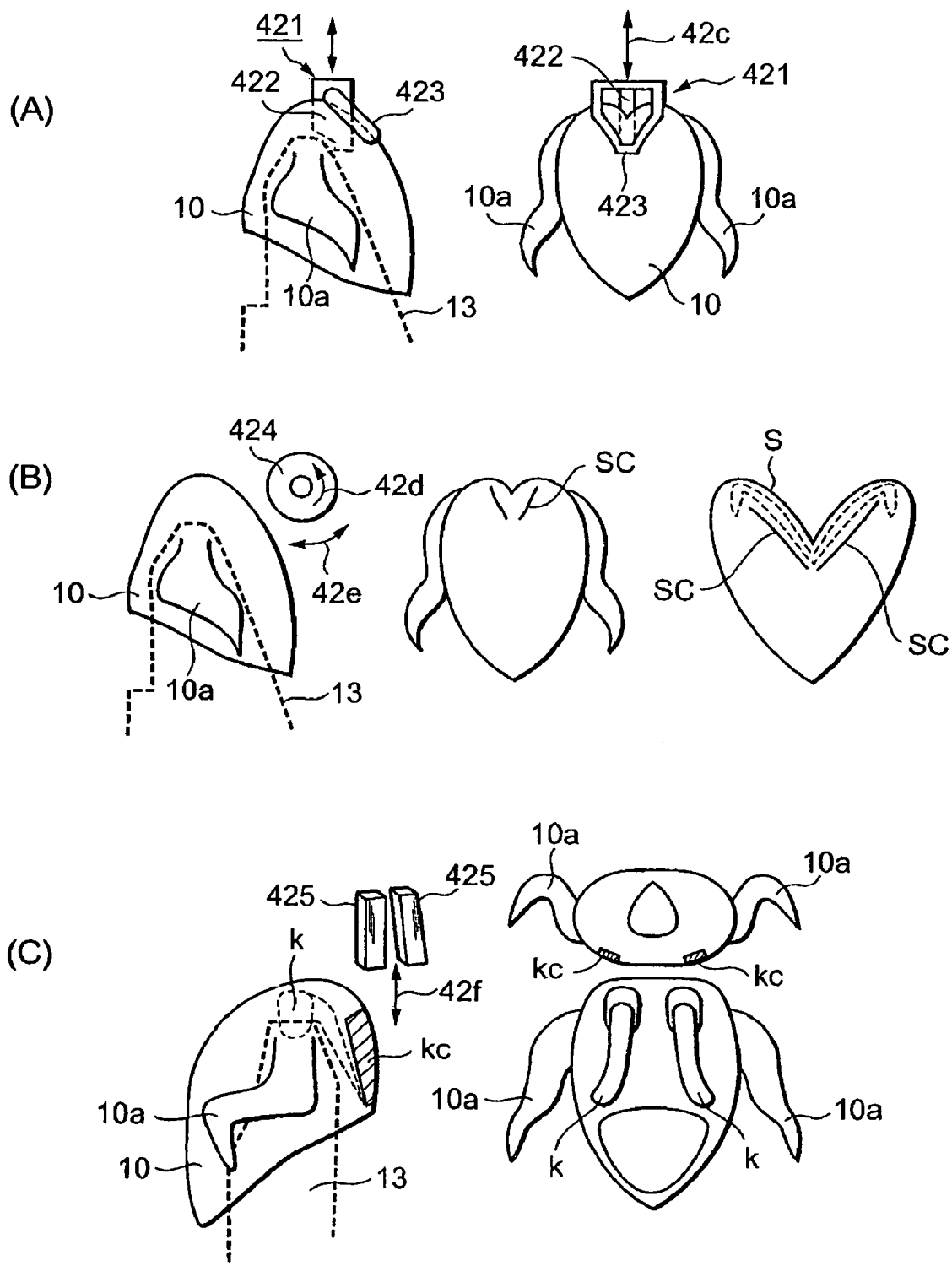
FIGS. 21(A), (B), (C) are representation of procedures of making incisions made along collar bones and ripping off meat from shoulder blades performed instead of ridge cutting and shoulder cutting performed at the $3^{rd}$ station of FIG. 2, (A) and (B) show the procedure of making incisions along collar bones, and (C) shows the procedure of ripping off meat from shoulder blades.

FIGS. 21 (A) and (B) show the procedure of making incisions along collar bones in said section 42a, and (C) shows the procedure of ripping off meat from shoulder blades in said section 42b at the $3^{rd}$ station of FIG. 2. In FIG. 2(A), a collar bone guide 421 movable in up-and-down directions 42c is lowered to insert the insert member 422 of the collar bone guide 421 into meat from the hole at the neck part, and the half body 10 is fixed in position by pressing the peripheral parts of the collar bones with a pushing member 423 from the outside surface of the half body 10. Then, as shown in FIG. 21(B), a pair of cutters 424, the cutters being disposed to form the general shape of a letter 'V' with the spacing between the cutter blades narrowed downward and located outside the attachment cone 13 so that they are movable in directions 42e to approach or draw away from the half body 10, move toward the half body 10 while rotating in the direction of 42d and make incisions SC of the general shape of a letter 'V' along right under the collar bones.

Then, the collar bone guide 421 is drawn back from the half body 10, and, as shown in FIG. 21(C), a pair of shoulder blade scrapers 425 disposed vertically and movably in up-and-down directions 42f near the coned part of the attachment cone 13 are lowered to rip off the meat kc adhered to the top surface of the shoulder blades k.

The meat adhered firmly to the shoulder blades k can be whittled away at the meat of shoulder blade part scraping section 42b shown in FIG. 21(C), and breast meat can be scraped more easily in the succeeding breast meat scraping section compared with the case of the ridge cutting section 22a shown in FIG. 7.

Further, in the case of shoulder cutting 22a shown in FIG. 7(A), as incisions are made near horizontally near the collar bones, the blades 22d may run into the collar bones, and it is not necessarily easy to make incisions only to the meat around the peripheral part of the collar bones, and there is a danger of cutting the collar bones themselves. In this case, a part of the collar bone may remain in the breast meat.

In the case of making collar bone part incision at the section 42a shown in FIGS. 21(A) and (B), as incisions SC of the general shape of a letter 'V' are made along right under the collar bones, only the meat is cut around the peripheral part of the collar bones, and there happens not such a problem as happens in the case of shoulder cutting shown in FIG. 7(B).

By virtues of the processing, the breast meat scraping can be performed smoothly at the succeeding breast meat scraping section 24. As incisions are made at the collar bone part incision making section 42a with the collar bones fixed in position as if they are secured in a box, the incisions SC can be made accurately right under the collar bones k, and stable and high yield cutting is possible. Further, as the meat kc adhered to the to the top surface of the shoulder blades k is ripped away at the coned part of the attachment cone 13 part not cut, increased yield rate is resulted and there is no fear of breaking the collar bones k.

INDUSTRIAL APPLICABILITY

The present invention brings about by the constitution described in the foregoing the following effects:

Pre-processing was reviewed to reduce the number of processing steps, and the shoulder skin scraping process of the prior art needed before carrying out pre-processing around the shoulders such as collarbone cutting, measurement, making incisions, etc. are omitted by providing the pre-processing step in which the half body is striped of the skin at the breast and both side parts before the half body is fed to the charging section for attaching the half body to the attachment cone. Further, the shoulder can be fixed to keep constant the width thereof irrespective of the difference in size of the individual half body and the slack in the skin of breast and both side parts resulting in that the cutting of the tendon between the shoulder joint and the head of humerus can be made accurately.

Therefore, the number of processing steps is reduced from 12 steps in the prior art to 8 steps in the present invention by providing the skin scraping process for scraping the skin of breast and both side parts before the half body is fed to the half body charging section where the half body is attached to the attachment cone and by improving the method of breast meat scraping, and further by composing to perform the shoulder cutting and ridge cutting of the prior art simultaneously in the present invention.

In the invention, by adopting integrated control by using a cam mechanism for controlling boning process in each station instead of linear and individual control of the prior art using hydraulic actuators, a variety of movement control with improved repeatability, synchronized motion, and intermittent motion are possible by a compact composition. As a variety of movement can be produced by the cam mechanism, movements of some component members needed in the prior art can be omitted, and the construction of the mechanical elements is simplified.

By adopting the control system using said cam mechanism instead of the hydraulic control system of the prior art, movement control along a variety of curved lines becomes possible. Therefore, movement can be controlled to match the processing in each station to result in increased yield. Further, as the integrated control can be exercised through the cam mechanism mechanically and positively instead of complex controlling by means of a plurality of linear controlling members, improvement in repeatability, synchronized motion, intermittent motion, and stable operation even in a humid atmosphere of the space for processing meat becomes possible.

By the way, the skin scraping process for scraping the skin of breast and both side parts of the half body before the half body is attached to the attachment cone at the half body charging section may be applied to other system insofar as the system is related to a system in which attachment cones to each of which the upper half of a slaughtered fowl (half body) is to be attached are provided to a transfer body and the transfer body is moved intermittently stepwise to transfer the attachment cones so that each of the attachment cone faces each station when the transfer body is stopped to allow each of the half body attached to each of the attachment cone to be automatically boned.

The invention claimed si:

1. An automatic boning system for an upper half body of a slaughtered fowl, the system comprising:
   a transfer body;
   attachment cones mounted to the transfer body, each for receiving the upper half body of the slaughtered fowl;
   stations adjacent the transfer body for processing the half body; and
   a pre-processing station adjacent to one of the stations for processing the half body,
   wherein the transfer body is advanceable intermittently stepwise to position each of the attachment cones at each of the stations to allow the half body to be processed at each station,
   wherein the one station is for attaching the half body to one of the attachment cones, and
   wherein the pre-processing station is located adjacent to the one station and includes a section for making incisions to the back of the half body, a section for scraping the skin of the half body, and a section for transferring the half body stripped of skin to the attachment cone at the one station.

2. The automatic boning system according to claim 1, wherein the transferring section transfers the half body with the breast side down, wherein the scraping section strips the breast skin and both side skin near the root of each wing under the axilla except the skin on the back of the half body between the incisions made on the back, and wherein the scraping section includes an attitude correction guide for correcting the attitude of the half body collapsed during the scraping of the breast skin.

3. The automatic boning system according to claim 1, wherein the skin scraping section includes one pair of peeler rollers composed of two shafts each having a spiral groove in an outer circumference thereof and rotatable in opposite directions to each other, the one pair of peeler rollers being located with the rotation axes thereof perpendicular to a transfer direction of the half body for stripping the skin of the front face of breast part, and two pairs of peeler rollers with the axes of rotation thereof parallel to the transfer direction of the half body for stripping both side skin near the root of each wing under the axilla, the two pairs of peeler rollers being positioned such that the two lines each connecting the rotation centers of each of the two pairs of rollers form the shape of a letter "V" when viewed in the transfer direction.

* * * * *